(12) United States Patent
Ueki

(10) Patent No.: US 6,496,459 B2
(45) Date of Patent: Dec. 17, 2002

(54) METHOD AND APPARATUS FOR RECORDING AND REPRODUCING INFORMATION ON AND FROM OPTICAL DISC

(75) Inventor: Yasuhiro Ueki, Sagamihara (JP)

(73) Assignee: Victor Company of Japan, Ltd., Yokohama (JP)

( * ) Notice: Subject to any disclaimer, the term of this patent is extended or adjusted under 35 U.S.C. 154(b) by 0 days.

(21) Appl. No.: 10/132,266

(22) Filed: Apr. 26, 2002

(65) Prior Publication Data

US 2002/0122365 A1 Sep. 5, 2002

Related U.S. Application Data

(62) Division of application No. 09/697,514, filed on Oct. 27, 2000, now Pat. No. 6,404,713.

(30) Foreign Application Priority Data

Nov. 16, 1999 (JP) .......................... 11-325956
Nov. 25, 1999 (JP) .......................... 11-334099

(51) Int. Cl.[7] ................................. G11B 7/00
(52) U.S. Cl. ............... 369/47.53; 369/53.1; 369/275.3
(58) Field of Search ..................... 369/47.1, 47.15, 369/47.16, 47.28, 47.46, 47.5, 47.53, 53.1, 53.31, 59.1, 59.11, 275.1, 275.3

(56) References Cited

U.S. PATENT DOCUMENTS

| 5,347,494 A | * | 9/1994 | Andersen ................. 367/189 |
| 5,559,785 A | | 9/1996 | Honda et al. |
| 5,745,451 A | * | 4/1998 | Mukawa et al. ............ 369/116 |
| 5,862,103 A | | 1/1999 | Matsumoto et al. |
| 5,872,763 A | | 2/1999 | Osakabe |

FOREIGN PATENT DOCUMENTS

| JP | 3-185628 | 8/1991 |
| JP | 6-12674 | 1/1994 |
| JP | 7-153106 | 6/1995 |

* cited by examiner

Primary Examiner—Muhammad Edun
(74) Attorney, Agent, or Firm—Louis Woo

(57) ABSTRACT

An apparatus for recording and reproducing an information signal on and from an optical disc includes a memory. The information signal is written into the memory. The information signal is read out from the memory. An optical head generates a laser beam in response to the readout information signal, and applies the laser beam to the optical disc to record the readout information signal on the optical disc. A test signal is recorded on a position of the optical disc near a recording position thereof via the optical head during the writing of the information signal into the memory. The test signal is reproduced from the optical disc. The reproduced test signal is evaluated to generate an evaluation result. An intensity of the laser beam is optimized in response to the evaluation result.

8 Claims, 19 Drawing Sheets

METHOD AND APPARATUS FOR RECORDING AND REPRODUCING INFORMATION ON AND FROM OPTICAL DISC

This is a division of application Ser. No. 09/697,514, filed Oct. 27, 2000, now U.S. Pat. No. 6,404,713.

BACKGROUND OF THE INVENTION

1. Field of the Invention

This invention relates to an apparatus for recording and reproducing information on and from an optical disc. In addition, this invention relates to a method of recording and reproducing information on and from an optical disc. Furthermore, this invention relates to an optical disc.

2. Description of the Related Art

Optical discs contain an MD (Mini Disc). MD players include shock-proof memories having a capacity of 4 MB which corresponds to a playback time of about 10 seconds. During the playback mode of operation of the MD player, a pickup sequentially accesses sectors on an MD and reproduces data therefrom. In the MD player, the reproduced data are temporarily stored in the shock-proof memory and are read out therefrom so that the contents of the data are played back. When the pickup jumps from a sector to a next sector, the pickup does not reproduce any data from the MD. Thus, during the playback mode of operation of the MD player, the reproduction of data from the MD by the pickup is sometimes interrupted for a short time. The shock-proof memory absorbs such an interruption of the reproduction of data from the MD, thereby providing continuous playback of the contents of the data. Specifically, data remain read out from the shock-proof memory and playback of the contents of the data continues even for a time during which the pickup jumps from a sector to a next sector while kicking across recording tracks on the MD and waiting for disc rotation to meet the next sector.

During the recording mode of operation of the MD player, a pickup sequentially accesses sectors on the MD and records data thereon. In the MD player, compressed data to be recorded are temporarily stored in the shock-proof memory. The compressed data are intermittently read out from the memory before being fed to the pickup and being recorded on the MD thereby. Thus, during the recording mode of operation of the MD player, the feed of data to the pickup is intermittently executed. The absence of data feed to the pickup is synchronized with jump of the pickup from a sector to a next sector. Accordingly, during the absence of data feed, the pickup jumps from a sector to a next sector while kicking across recording tracks on the MD and waiting for disc rotation to meet the next sector.

Optical discs contain a DVD (Digital Video Disc or Digital Versatile Disc). DVD players include shock-proof memories similar in function to those in the MD players. Typical shock-proof memories in the DVD players have a capacity of 16 MB which corresponds to a playback time of about 2 seconds. Advanced shock-proof memories in the DVD players have a capacity of more than 16 MB which corresponds to a playback time of longer than 2 seconds. Optical discs are of a read only type (a playback only type), a recordable type (a write once type), and a rewritable type. A CD (Compact Disc), a VCD (Video CD), and a DVD are optical discs of the read only type. A CD-R and a DVD-R are optical discs of the recordable type. A CD-RW, a DVD-RAM, and a DVD-RW are optical discs of the rewritable type.

Optical discs of the rewritable type have thin recording films which are reversibly changed between two or more different states in accordance with conditions of laser beams applied thereto. Rewritable optical discs include magneto-optical discs and phase change discs.

In the case of a phase change optical disc, while a recording film is scanned by a laser beam, the recording film is reversibly changed between an amorphous state and a crystalline state by changing conditions of the laser beam in response to a signal to be recorded. Thus, the signal is recorded on the recording film as a pattern of amorphous portions and crystalline portions of the recording film. The signal is reproduced from the phase change optical disc as follows. The surface of an amorphous portion of the disc and the surface of a crystalline portion thereof are different in reflectivity with respect to a laser beam. While the phase change optical disc is scanned by a laser beam, a change in reflectivity of the disc surface with respect to the laser beam is optically detected so that the signal is reproduced from the disc.

The phase change optical disc is similar to a read only optical disc and a recordable optical disc in the point that signal reproduction is implemented by detecting a change in the disc surface reflectivity with respect to a laser beam. Signal overwriting on the phase change optical disc can be performed by use of only one laser beam when the laser power is modulated between an erasing level Pe and a recording level Pw. Therefore, the structure of a drive device for the phase change optical disc can be simple.

It is conceivable to use a PWM (pulse width modulation) system to record a signal on a rewritable optical disc at a high density. According to the PWM system, the positions of the front and rear edges of every recording mark on the disc correspond to "1" in a digital signal.

In the PWM system, the width of every recording mark represents information. Thus, a desirable shape of the recording mark is free from distortion. Specifically, it is desirable that the shapes of the front and rear halves of the recording mark are symmetrical with each other. During the PWM-based recording of a signal on the disc, the disc is exposed to a laser beam while being rotated and moved relative thereto. In addition, the intensity of the laser beam is changed between strong and weak levels in response to the signal to be recorded. Recording marks are formed on portions of the disc which are exposed to the stronger laser beam. Regarding every recording mark, the heat accumulation effect causes the stronger-beam-application ending point on the disc to be higher in temperature than the stronger-beam-application starting point on the disc. As a result, the rear end of the recording mark is wider than the front end thereof. Thus, the shape of the recording mark is distorted.

Japanese published unexamined patent application 3-185628 discloses a method of reducing distortion in the shape of a recording mark. The method in Japanese application 3-185628 is an overwriting method in which one recording mark is formed by the application of a train of short pulses (narrow pulses) of a laser beam to a disc.

Japanese published unexamined patent application 6-12674 discloses a method of correcting the waveform of a train of electric pulses fed to a laser source. According to the method in Japanese application 6-12674, an input signal repetitively changes between a high level state and a low level state. The input signal being continuously in the high level state corresponds to one recording mark. The input signal being continuously in the high level state is converted into a train of electric short pulses (electric narrow pulses). The first pulse in the train is wider than the second and later pulses therein. The number of the pulses in the train is determined by a desired length of the recording mark. The electric pulse train is fed to the laser source. The electric pulse train is converted by the laser source into a corresponding train of short pulses (narrow pulses) of a laser beam. The laser beam pulse train is applied to a disc. One recording mark is formed on the disc in response to the laser beam pulse train. Since the first pulse in the train is relatively wide, the temperature of the beam-train-application starting point on the disc quickly rises. On the other hand, since the second and later pulses in the train are relatively narrow, the temperature of the beam-train-application ending point on the disc is prevented from excessively rising. Therefore, it is possible to compensate for the heat accumulation effect which would cause distortion of the recording mark.

The shape-distortion reducing technique in Japanese application 6-12674 is less effective as the linear velocity related to the scanning of a disc increases. In the method of Japanese application 6-12674, a train of short pulses (narrow pulses) of a laser beam is applied to the recording film of a disc to form a recording mark thereon. The pulsative laser beam results in decreased energy applied to the recording film of the disc. Accordingly, a required instantaneous power of the laser beam is relatively high. In addition, a required instantaneous power of the laser beam rises as the linear velocity related to the scanning of the disc increases. A high-power laser source is expensive.

In the method of Japanese application 6-12674, the input signal being continuously in the high level state is converted into a train of electric short pulses. It is necessary to use a clock signal in the conversion of the high-level input signal into the electric pulse train. The period of the clock signal is equal to the period of the input signal which is divided by a given integer. As the frequency of the input signal rises, the required frequency of the clock signal increases. An excessively high frequency of the clock signal causes difficulty in circuit designing. Modulation of the laser power at a higher frequency causes greater distortion in the waveform of the laser beam.

In a CAV (constant angular velocity) disc drive system, a disc is rotated at a constant angular speed. In this case, the linear velocity related to the scanning of an outer portion of the disc is higher than that of an inner portion of the disc. According to a proposed method, the length of a recording mark on an inner portion of a disc and the length of that on an outer portion of the disc are set the same to increase the recording density. In the proposed method, the recording frequency at a position on the disc increases as the position is closer to the outer edge of the disc.

In a CLV (constant linear velocity) disc drive system, a disc is rotated at a constant linear speed. A conceivable CLV recording apparatus is able to record signals on discs of different types. The conceivable CLV recording apparatus is required to change the linear velocity and the recording frequency depending on the disc type.

Optimal recording conditions of a disc having a high recording density vary from disc to disc. In addition, the optimal recording conditions depend on the number of times of signal recording on the disc, the ambient temperature, and other factors. According to a conceivable method of detecting optimal recording conditions of a disc, signal recording on the disc is interrupted, and a recording head is moved to a test area of the disc. Then, a test signal is recorded on the test area, and the test signal is reproduced therefrom. The quality of the reproduced test signal is measured. Optimal recording conditions of the disc are detected on the basis of the measurement results. After the optimal recording conditions are detected, the recording of a main information signal on the disc is started. The recording of the main information signal is implemented under the optimal recording conditions. In the conceivable method, the detection of optimal recording conditions takes a long time. Thus, there is a long wait until the recording of the main information signal on the disc is started.

The power of a laser beam depends on the ambient temperature and the aging of a laser source. To maintain accurate signal recording on a disc, it is necessary to compensate for such a variation in the power of the laser beam. In a conceivable method, signal recording on the disc is interrupted, and the power of a laser beam is measured. Optimal drive conditions of a laser source are decided on the basis of the measurement results. In the conceivable method, the decision as to optimal drive conditions of the laser source takes a long time.

A prior-art method of detecting optimal recording conditions of a CD-R has a step of measuring the asymmetry of a reproduced signal. A DVD-R, a DVD-RW, other organic-dye recordable optical discs, other phase change rewritable optical discs, and other recordable and rewritable optical discs having high recording densities are made from various selections of materials in various fabrication methods. Therefore, if the prior-art method is applied to such a high-recording-density disc, the results of the detection of optimal recording conditions are unreliable.

A phase change optical disc has the following problem. As a same signal is repetitively recorded on a same position on the disc at a same timing, the jitter-related quality of a signal reproduced therefrom deteriorates.

SUMMARY OF THE INVENTION

It is a first object of this invention to provide an improved apparatus for recording and reproducing information on and from an optical disc.

It is a second object of this invention to provide an improved method of recording and reproducing information on and from an optical disc.

It is a third object of this invention to provide an improved optical disc.

A first aspect of this invention provides an apparatus for recording and reproducing an information signal on and from an optical disc. The apparatus comprises a memory; means for writing the information signal into the memory; means for reading out the information signal from the memory; an optical head for generating a laser beam in response to the readout information signal, and applying the laser beam to the optical disc to record the readout information signal on the optical disc; means for recording a test signal on a position of the optical disc near a recording position thereof via the optical head during the writing of the information signal into the memory; means for reproducing the test signal from the optical disc; means for evaluating the reproduced test signal to generate an evaluation result; and means for optimizing an intensity of the laser beam in response to the evaluation result.

A second aspect of this invention provides an apparatus for recording and reproducing an information signal on and from an optical disc. The apparatus comprises a memory; means for writing the information signal into the memory; means for reading out the information signal from the memory; an optical head for generating a laser beam in response to the readout information signal, and applying the laser beam to the optical disc to record the readout information signal on the optical disc; means for changing a power of the laser beam among a plurality of different levels; means for measuring the laser beam to generate measurement result values during the change of the power of the laser beam among the plurality of the different levels; and means for optimizing an intensity of the laser beam in response to the measurement result values.

A third aspect of this invention is based on the first aspect thereof, and provides an apparatus wherein the test signal comprises a test pattern signal, and the recording means comprises means for recording the test pattern signal on the optical disc via the optical head while changing an intensity of the laser beam among a plurality of different levels for a testing purpose, and wherein the reproducing means comprises means for reproducing the test pattern signal from the optical disc, and the evaluating means comprises means for evaluating at least one of asymmetry and jitter of the reproduced test pattern signal to generate the evaluation result.

A fourth aspect of this invention is based on the second aspect thereof, and provides an apparatus further comprising means for repetitively measuring the laser beam to repetitively generate a measurement result value, means for calculating a difference between a current measurement result value and an immediately preceding measurement result value, and means for enabling the optimizing means to optimize the intensity of the laser beam when the calculated difference is equal to or greater than a predetermined value.

A fifth aspect of this invention is based on the first aspect thereof, and provides an apparatus further comprising means for repetitively measuring a temperature to repetitively generate a measured temperature value, means for calculating a difference between a current measured temperature value and an immediately preceding measured temperature value, and means for enabling the optimizing means to optimize the intensity of the laser beam when the calculated difference is equal to or greater than a predetermined value.

A sixth aspect of this invention is based on the first aspect thereof, and provides an apparatus further comprising means for measuring a lapse of time since a moment of the last optimization of the intensity of the laser beam, and for deciding whether or not the measured lapse of time exceeds a predetermined time to generate a decision result, and means for optimizing the intensity of the laser beam in response to the decision result.

A seventh aspect of this invention is based on the first aspect thereof, and provides an apparatus further comprising means for measuring a distance between a current recording position and a next recording position on the optical disc, and deciding whether or not the measured distance exceeds a predetermined distance to generate a decision result, and means for optimizing the intensity of the laser beam in response to the decision result.

An eighth aspect of this invention provides a method of recording and reproducing an information signal on and from an optical disc. The method comprises the steps of writing an information signal into a memory; reading out the information signal from the memory; generating a laser beam in response to the readout information signal, and applying the laser beam to the optical disc to record the readout information signal on the optical disc; recording a test signal on a position of the optical disc near a recording position thereof via the optical head during the writing of the information signal into the memory; reproducing the test signal from the optical disc; evaluating the reproduced test signal to generate an evaluation result; and optimizing an intensity of the laser beam in response to the evaluation result.

A ninth aspect of this invention provides an optical disc having an area storing information of an intensity of a laser beam which has been optimized by the apparatus of the first aspect of this invention.

A tenth aspect of this invention provides n apparatus for recording and reproducing an information signal on and from an optical disc. The apparatus comprises a memory; means for writing the information signal into the memory; means for reading out the information signal from the memory; an optical head for generating a laser beam in response to the readout information signal, and applying the laser beam to the optical disc to record the readout information signal on the optical disc; means for recording a test signal on a position of the optical disc near a recording position thereof via the optical head during the writing of the information signal into the memory; means for reproducing the test signal from the optical disc; first optimizing means for measuring asymmetry of the reproduced test signal, and optimizing an intensity of the laser beam in response to the measured asymmetry; second optimizing means for measuring jitter of the reproduced test signal, and optimizing the intensity of the laser beam in response to the measured jitter; third optimizing means for measuring the laser beam to generate a measurement result, and optimizing the intensity of the laser beam in response to the measurement result; means for detecting a type of the optical disc; and means for selecting at least one of the first, second, and third optimizing means in response to the detected type, and enabling the selected one of the first, second, and third optimizing means.

An eleventh aspect of this invention is based on the tenth aspect thereof, and provides an apparatus wherein the type detecting means comprises means for deciding whether the type of the optical disc is an organic-dye type or a phase change type to generate a type decision result, and the selecting means comprises means for selecting at least one of the first, second, and third optimizing means in response to the type decision result, and enabling the selected one of the first, second, and third optimizing means.

A twelfth aspect of this invention is based on the tenth aspect thereof, and provides an apparatus wherein the type detecting means comprises means for reproducing disc information from the optical disc, and means for deriving a disc maker from the reproduced disc information, and wherein the selecting means comprises means for selecting at least one of the first, second, and third optimizing means in response to the disc maker, and enabling the selected one of the first, second, and third optimizing means.

A thirteenth aspect of this invention is based on the tenth aspect thereof, and provides an apparatus wherein the type detecting means comprises means for reproducing disc information from the optical disc, and means for deriving a disc article number from the reproduced disc information, and wherein the selecting means comprises means for selecting at least one of the first, second, and third optimizing means in response to the disc article number, and enabling the selected one of the first, second, and third optimizing means.

A fourteenth aspect of this invention is based on the tenth aspect thereof, and provides an apparatus wherein the type detecting means comprises means for reproducing disc information from the optical disc, and means for deriving a disc production lot number from the reproduced disc information, and wherein the selecting means comprises means for selecting at least one of the first, second, and third optimizing means in response to the disc production lot number, and enabling the selected one of the first, second, and third optimizing means.

A fifteenth aspect of this invention provides an apparatus for recording and reproducing an information signal on and from an optical disc. The apparatus comprises a memory; means for writing the information signal into the memory; means for reading out the information signal from the memory; an optical head for generating a laser beam in response to the readout information signal, and applying the laser beam to the optical disc to record the readout information signal on the optical disc; means for repetitively recording a test signal on a place on the optical disc via the optical head, the place being near a recording position of the optical disc which is subjected to signal recording next; means for reproducing the test signal from the optical disc; means for evaluating the reproduced test signal to generate an evaluation result; means for optimizing an intensity of the laser beam in response to the evaluation result; and means for changing the test signal on a recording-by-recording basis.

A sixteenth aspect of this invention is based on the fifteenth aspect thereof, and provides an apparatus wherein the changing means comprises means for generating a random signal providing a random timing, and means for shifting the test signal in response to the random timing to change the test signal on the recording-by-recording basis.

A seventeenth aspect of this invention is based on the fifteenth aspect thereof, and provides an apparatus wherein the changing means comprises means for time-positionally exchanging signal segments of the test signal to change the test signal on the recording-by-recording basis.

An eighteenth aspect of this invention provides an apparatus for recording and reproducing an information signal on and from an optical disc. The apparatus comprises means for generating a laser beam in response to a first time segment of the information signal, and applying the laser beam to a first place on the optical disc to record the first time segment of the information signal on the first place on the optical disc; means for generating a laser beam in response to a test signal, and applying the laser beam to a second place on the optical disc to record the test signal on the second place on the optical disc while changing the laser beam among a plurality of conditions different from each other, the second place immediately following the first place; means for reproducing the test signal from the optical disc; means for evaluating the reproduced test signal to generate evaluation results corresponding to the respective different conditions of the laser beam; means for deciding a best of the evaluation results; and means for generating a laser beam in one of the different conditions which corresponds to the best evaluation result and in response to a second time segment of the information signal, and applying the laser beam to the second place on the optical disc to write the second time segment of the information signal over the test signal on the second place on the optical disc, the second time segment immediately following the first time segment.

A nineteenth aspect of this invention is based on the eighteenth aspect thereof, and provides an apparatus wherein the different conditions of the laser beam comprise different conditions of pulses in pulse trains of the laser beam.

A twentieth aspect of this invention provides an apparatus for recording and reproducing an information signal on and from an optical disc. The apparatus comprises a memory; means for writing the information signal into the memory; means for reading out the information signal from the memory; an optical head for generating a laser beam in response to the readout information signal, and applying the laser beam to the optical disc to record the readout information signal on the optical disc; means for recording a test signal on the optical disc via the optical head while changing the laser beam among a plurality of conditions different from each other for a testing purpose during the writing of the information signal into the memory; means for reproducing the test signal from the optical disc; means for evaluating the reproduced test signal to generate evaluation results corresponding to the respective different conditions of the laser beam; means for deciding a best of the evaluation results; and means for controlling the laser beam into one of the different conditions which corresponds to the best evaluation result.

A twenty-first aspect of this invention is based on the twentieth aspect thereof, and provides an apparatus wherein the different conditions of the laser beam comprise different conditions of pulses in pulse trains of the laser beam.

DESCRIPTION OF THE PREFERRED EMBODIMENTS

First Embodiment

A first embodiment of this invention is designed to correct a recording laser beam into an optimal waveform in accordance with the type of an optical disc and a variation in the linear velocity related to the scanning of the disc.

Figure 1:
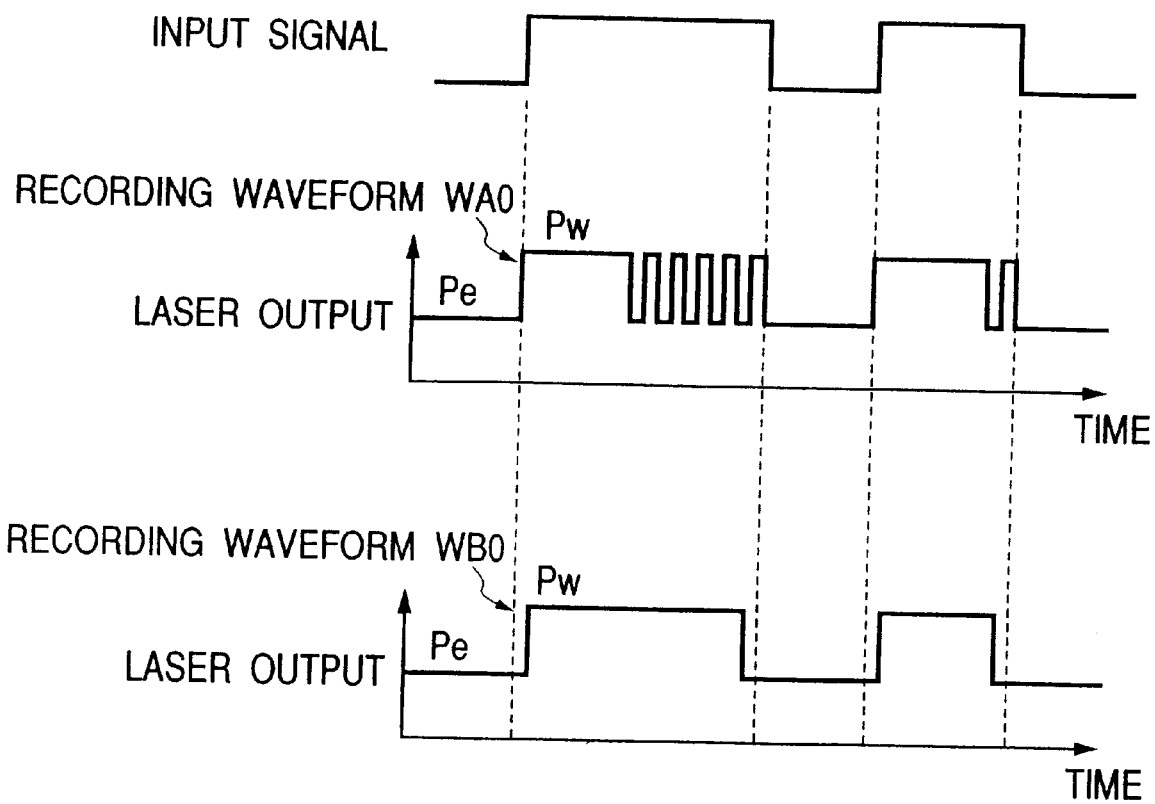
FIG. 1 is a time-domain diagram of a waveform of an input signal, and recording waveforms of a laser beam.

As shown in FIG. 1, an input signal (for example, an 8-16 modulation-resultant signal) repetitively changes between a high level state and a low level state. In the case where the linear velocity related to the scanning of the disc is lower than a preset velocity, a laser beam is modulated into a recording waveform WAO having trains of short pulses (narrow pulses). The power of the laser beam changes between an erasing level Pe and a recording level Pw. Each laser-beam pulse train in the recording waveform WAO corresponds to the input signal being continuously in the high level state. The first pulse in the train is wider than the second and later pulses therein. The number of the pulses in the train increases as the time interval for which the input signal is continuously in the high level state increases.

In the case where the linear velocity related to the scanning of the disc is equal to or higher than the preset velocity, the laser beam is modulated into a recording waveform WBO having wide pulses as shown in FIG. 1. The power of the laser beam changes between an erasing level Pe and a recording level Pw. Each laser-beam pulse in the recording waveform WBO corresponds to the input signal being continuously in the high level state. The duration of the laser-beam pulse is slightly shorter than the corresponding time interval for which the input signal is continuously in the high level state.

Experiments were performed to determine the relation between the linear velocity related to the scanning of a phase change optical disc and the waveform distortion of a signal reproduced from the disc. During the experiments, signal recording on and signal reproduction from the disc were implemented while the linear velocity and the recording waveform were changed.

Figure 2:
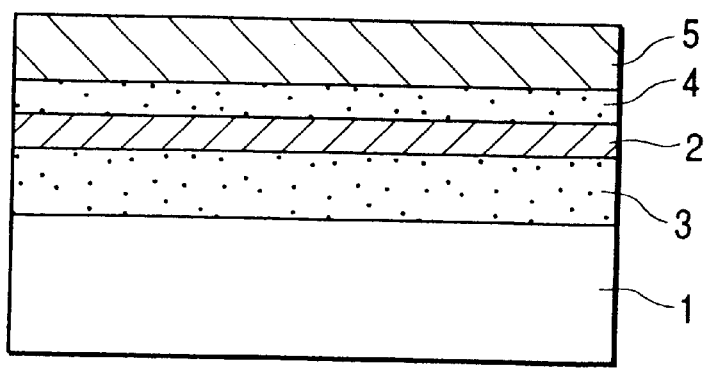
FIG. 2 is a sectional view of a portion of an optical disc.

As shown in FIG. 2, the phase change optical disc used in the experiments included a substrate 1 made of polycarbonate. The disc had a diameter of 120 mm. The disc was formed with a signal recording track. A dielectric film 3, a recording film 2, a dielectric film 4, and a reflecting layer 5 were sequentially laminated on the substrate 1 in that order. The recording film 2 was made of GeSbTe. The recording film 2 had a thickness of 20 nm. The dielectric films 3 and 4 were made of ZnS. The dielectric film 3 had a thickness of 150 nm. The dielectric film 4 had a thickness of 15 nm. The reflecting film 5 was made of Au. The reflecting film 5 had a thickness of 50 nm.

After the whole surface of the recording film 2 of the disc was crystallized (that is, after a signal was completely erased from the whole surface of the recording film 2 of the disc), the disc was scanned by a laser beam responsive to an input signal. Specifically, while the disc was rotated, the laser beam having a recording power level was intermittently applied to the surface of the recording film 2 in response to the input signal. Portions of the surface of the recording film 2 which were exposed to the recording-power-level laser beam changed to an amorphous state. Thus, the input signal was recorded on the recording film 2 as recording marks formed by the respective amorphous portions of the surface of the recording film 2. The linear velocity related to the scanning of the disc was changed among 1.5 m/s, 3 m/s, 6 m/s, and 9 m/s. The input signal was an 8-16 modulation-resultant signal. The laser beam was emitted from a semiconductor laser. The input signal was recorded on the disc by using a laser-beam recording waveform WA based on the recording waveform WAO (see FIG. 1). In addition, the input signal was recorded on the disc by using a laser-beam recording waveform WB corresponding to the recording waveform WBO (see FIG. 1).

Figure 3:
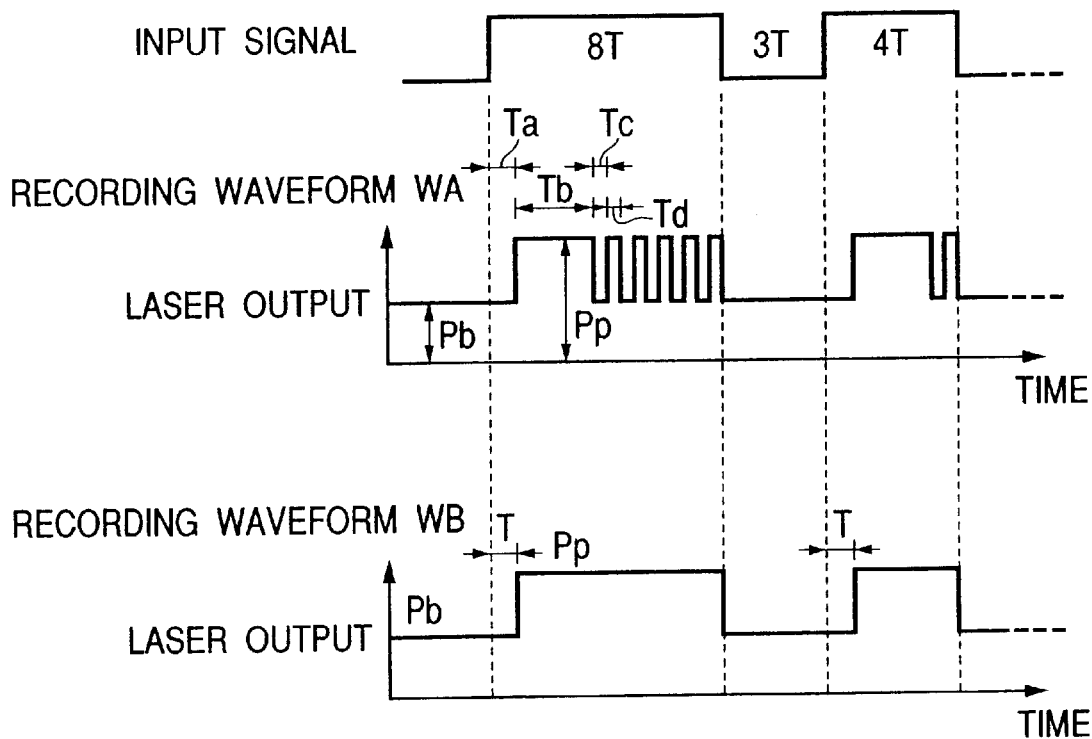
FIG. 3 is a time-domain diagram of a waveform of an input signal, and recording waveforms of a laser beam.

As shown in FIG. 3, the 8-16 modulation-resultant signal (the input signal) repetitively changed between a high level state and a low level state. A clock signal (a bit clock signal) related to the 8-16 modulation-resultant signal had a period T. The period T is also indicated as T. As shown in FIG. 3, the laser-beam recording waveform WA was generated in response to the 8-16 modulation-resultant signal (the input signal). According to the laser-beam recording waveform WA, the power (or the intensity) of the laser beam changed between an erasing level Pb and a recording level Pp. It should be noted that the erasing level Pb and the recording level Pp may be variable. The laser-beam recording waveform WA had trains of short pulses (narrow pulses). Each laser-beam pulse train in the recording waveform WA corresponded to the 8-16 modulation-resultant signal being continuously in the high level state. The moment of the occurrence of the leading edge of the first pulse in the train follows the moment of the occurrence of the rising edge in the 8-16 modulation-resultant signal by a time interval Ta set to T. The first pulse in the train had a width or duration Th set to 1.5 T. The second and later pulses in the train had a width or duration Td set to 0.5 T. In the train, the pulses were spaced at intervals Tc set to 0.5 T. It should be noted that the time intervals Ta, Tb, Tc, and Td may be variable. A clock signal used to generate the laser-beam recording waveform WA had a frequency equal to twice the frequency of the clock signal related to the 8-16 modulation-resultant signal.

As shown in FIG. 3, the laser-beam recording waveform WB was generated in response to the 8-16 modulation-resultant signal (the input signal). According to the laser-beam recording waveform WB, the power (or the intensity) of the laser beam changed between an erasing level Pb and a recording level Pp. The laser-beam recording waveform WB had wide pulses. Each laser-beam pulse in the recording waveform WB corresponded to the 8-16 modulation-resultant signal being continuously in the high level state. The duration of the laser-beam pulse is shorter than the corresponding time interval for which the input signal is continuously in the high level state by a value set to T. The moment of the occurrence of the leading edge of the laser-beam pulse follows the moment of the occurrence of the rising edge in the 8-16 modulation-resultant signal by a time interval set to T.

The frequency of the clock signal related to the 8-16 modulation-resultant signal was varied in response to the disc-scanning linear velocity so that the lengths of recording marks on the disc remained constant independent of the disc-scanning linear velocity. Specifically, the clock frequency was 4.3 MHz when the linear velocity was 1.5 m/s. The clock frequency was 8.6 MHz when the linear velocity was 3 m/s. The clock frequency was 17.2 MHz when the linear velocity was 6 m/s. The clock frequency was 25.8 MHz when the linear velocity was 9 m/s.

After the signal was recorded on the disc, the signal was reproduced therefrom. The waveform distortion of the reproduced signal was quantitatively evaluated. Specifically, the reproduced signal was converted into a binary signal (a two-level signal). The binary signal was inputted into a time interval analyzer so that the jitter amount of the binary signal was detected as a phase margin. The errors of the positions of the front and rear edges of recording marks decreased and hence the distortions of the recording marks decreased as the phase margin increased.

Figure 4:
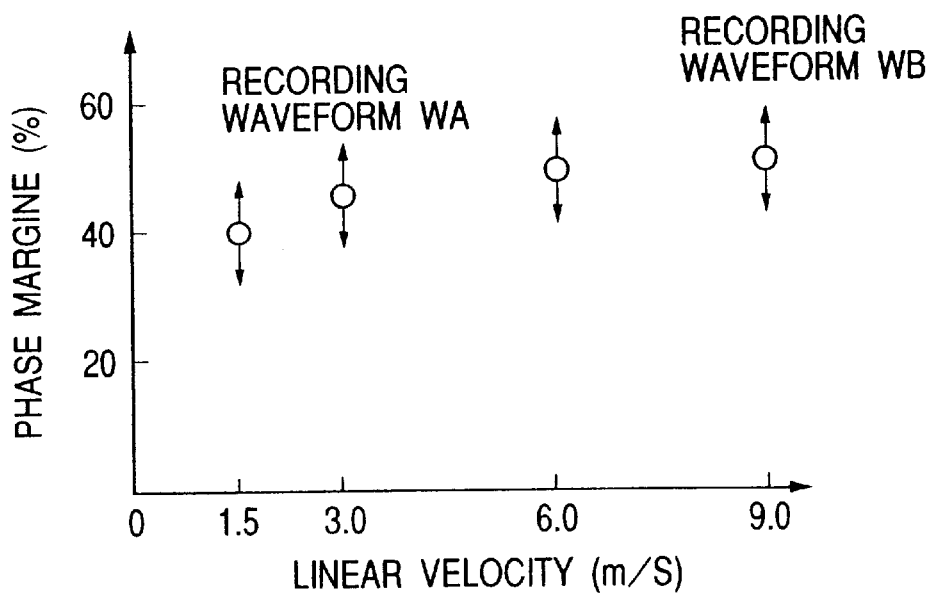
FIG. 4 is a diagram of the relation between a disc-scanning linear velocity and a phase margin.
Figure 5:
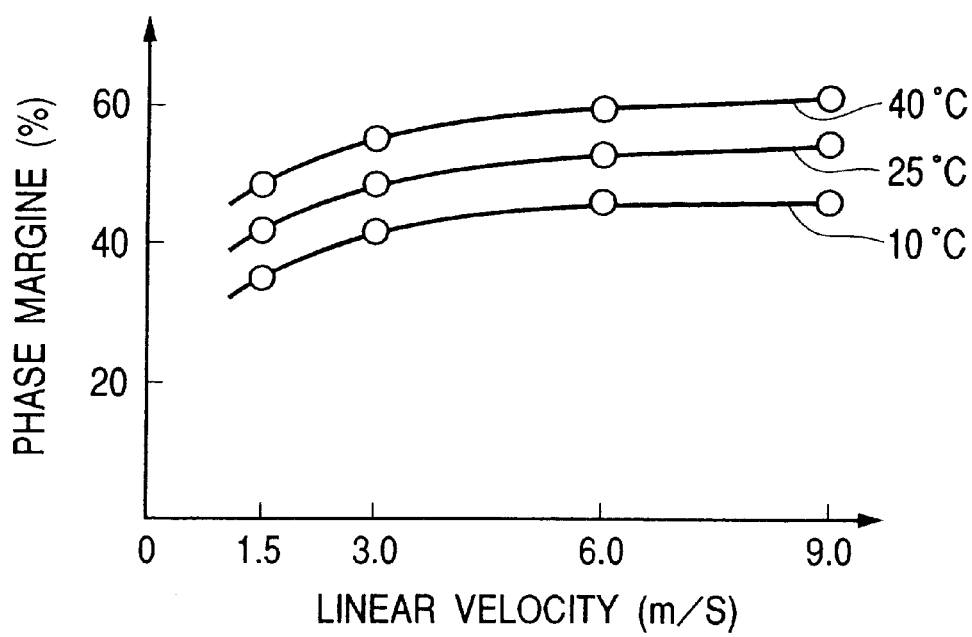
FIG. 5 is a diagram of the relation among the disc-scanning linear velocity, the phase margin, and a temperature.
Figure 6:
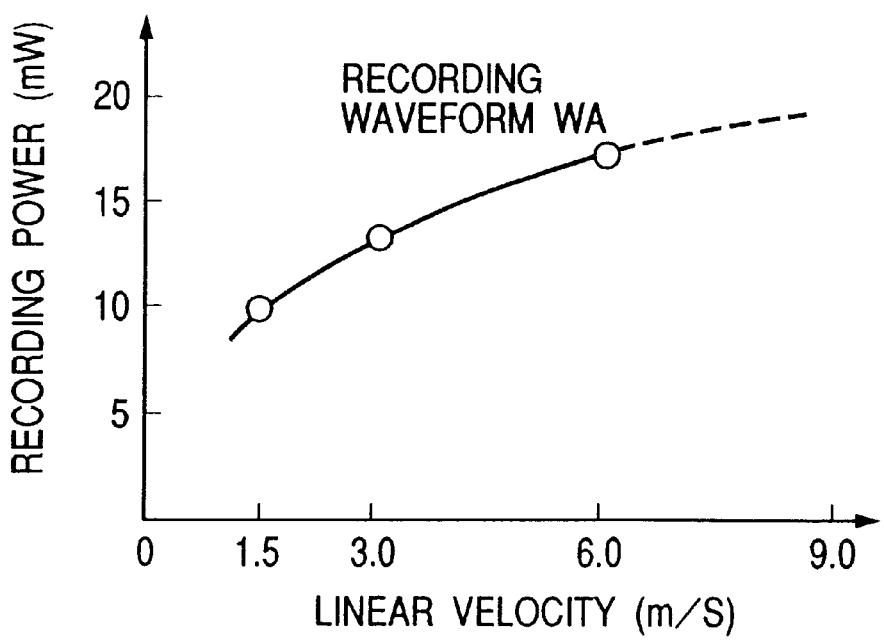
FIG. 6 is a diagram of the relation between the disc-scanning linear velocity and a recording power.

During the experiments, the phase margin was measured for each of optical discs of several types. FIG. 4 shows the experimentally obtained relation between the variation in the phase margin and the linear velocity related to the scanning of the discs. The recording waveform WA was used when the linear velocity was 1.5 m/s, 3.0 m/s, and 6.0 m/s. The recording waveform WB was used when the linear velocity was 9.0 m/s. With reference to FIG. 4, the phase margin increased as the linear velocity increased. As shown in FIG. 5, the relation between the phase margin and the disc-scanning linear velocity depended on the ambient temperature of the disc. Specifically, the phase margin increased as the ambient temperature of the disc rose. As shown in FIG. 6, the recording power level Pp of the laser beam on the disc and having the waveform WA was increased in accordance with an increase in the disc-scanning linear velocity. The erasing power level Pb of the laser beam on the disc remained constant regardless of the type of the recording waveform and independent of the disc-scanning linear velocity.

As is clear from FIG. 4, the recording waveform WA is good in that the phase margin increases as the disc-scanning velocity increases. In the case of the recording waveform WA, the phase margin varies from disc to disc. It is revealed in FIG. 5 that the phase margin depends on the ambient disc temperature. The cause of the dependency of the phase margin on the ambient disc temperature is as follows. Signal overwriting on the disc is governed by the temperature to which the recording film of the disc is heated. The temperature to which the recording film of the disc is heated deviates from the optimal value due to a fluctuation in the disc-scanning linear velocity, a variation in the ambient disc temperature, and a disc-by-disc variation in the disc conditions. As shown in FIG. 6, the recording power level Pp of the laser beam is set relatively great since the recording waveform WA applies pulsative energy to the recording film of the disc. Thus, a high-power semiconductor laser is used for drive of the disc at a high linear velocity.

Figure 7:
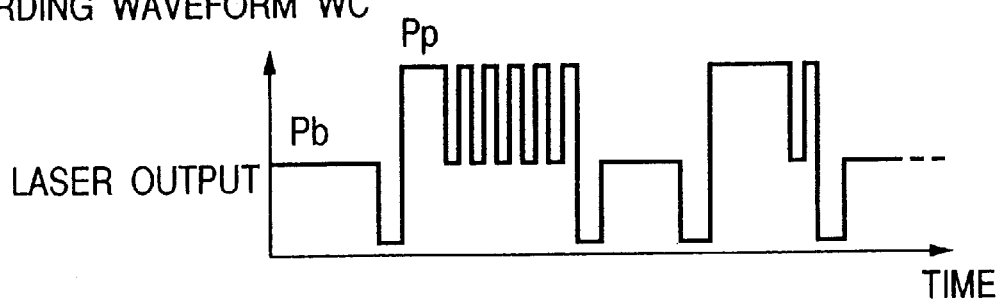
FIG. 7 is a diagram of a recording waveform of a laser beam.

FIG. 7 shows a laser-beam recording waveform WC which may replace the laser-beam recording waveform WA (see FIG. 3). The recording waveform WC is similar to the recording waveform WA except for the following points. In the recording waveform WC of FIG. 7, during a limited time interval immediately preceding each pulse train, the power of a laser beam is lower than an erasing level Pb. Also, during a limited time interval immediately following each pulse train, the power of the laser beam is lower than the erasing level Pb. In the case where intervals between recording marks are relatively narrow, there occurs heat interference such that heat of forming a recording mark diffuses rearward into a disc portion to be exposed to a recording-power laser beam next and hence a next recording mark has a greater size. The recording waveform WC reduces the effect of heat interference. Thus, the recording waveform WC is advantageous in increasing the phase margin. In the case where the limited time interval for which the power of the laser beam is lower than the erasing level Pb is excessively long, the recording film of the disc does not reach the crystallization temperature and hence the recorded signal fails to be erased. To prevent such a problem, it is preferable that the limited time interval "τ" for which the power of the laser beam is lower than the erasing level Pb has the following relation with the wavelength "λ" of the laser beam and the relative speed "V" between the laser beam spot and the disc.

$$\tau \leq \lambda/V \qquad (1)$$

As long as the relation (1) is satisfied, the recording film in a disc portion assigned to a recording mark is surely heated to the crystallization temperature by application of the recording-power laser beam thereto and also application of the erasing-power laser beam to a previous disc portion.

The laser-beam recording waveform WC may be modified as follows. According to a first modification of the laser-beam recording waveform WC, only during the limited time interval immediately preceding each pulse train, the power of a laser beam is lower than the erasing level Pb. According to a second modification of the laser-beam recording waveform WC, only during the limited time interval immediately following each pulse train, the power of the laser beam is lower than the erasing level Pb.

In the laser-beam recording waveform WC, the low power level of the laser beam which occurs during every limited time interval may be equal to a reproducing power level or a null power level. In this case, the structure of the disc drive can be simple.

The laser-beam recording waveform WB (see FIG. 3) may be modified as follows. According to a first modification of the laser-beam recording waveform WB, during a limited time interval immediately preceding each pulse, the power of a laser beam is lower than the erasing level Pb. Also, during a limited time interval immediately following each pulse, the power of the laser beam is lower than the erasing level Pb. According to a second modification of the laser-beam recording waveform WB, only during the limited time interval immediately preceding each pulse, the power of the laser beam is lower than the erasing level Pb. According to a third modification of the laser-beam recording waveform WB, only during the limited time interval immediately following each pulse, the power of the laser beam is lower than the erasing level Pb.

Figure 8:
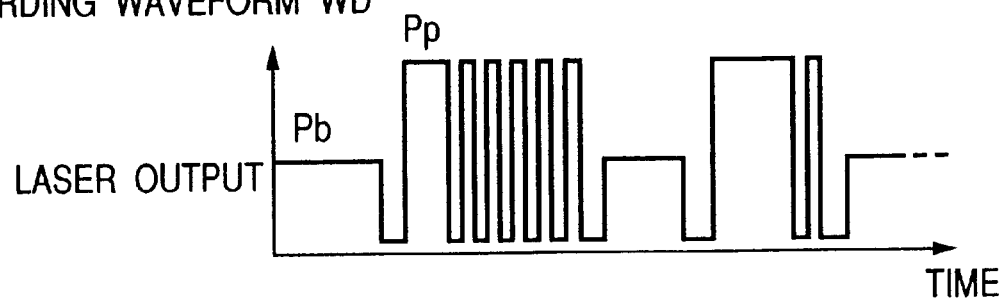
FIG. 8 is a diagram of a recording waveform of a laser beam.

FIG. 8 shows a laser-beam recording waveform WD which may replace the laser-beam recording waveform WC (see FIG. 7) or the laser-beam recording waveform WA (see FIG. 3). The recording waveform WD is similar to the recording waveform WC except for the following point. According to the recording waveform WD of FIG. 8, in each pulse train, the power of a laser beam changes between a recording level Pp and a reproducing level (or a null level). The recording waveform WD causes every position in a recording mark to be quickly cooled after being melt. Thus, it is possible to stably form a recording mark. In addition, the recording waveform WD is advantageous in increasing the phase margin.

Figure 9:
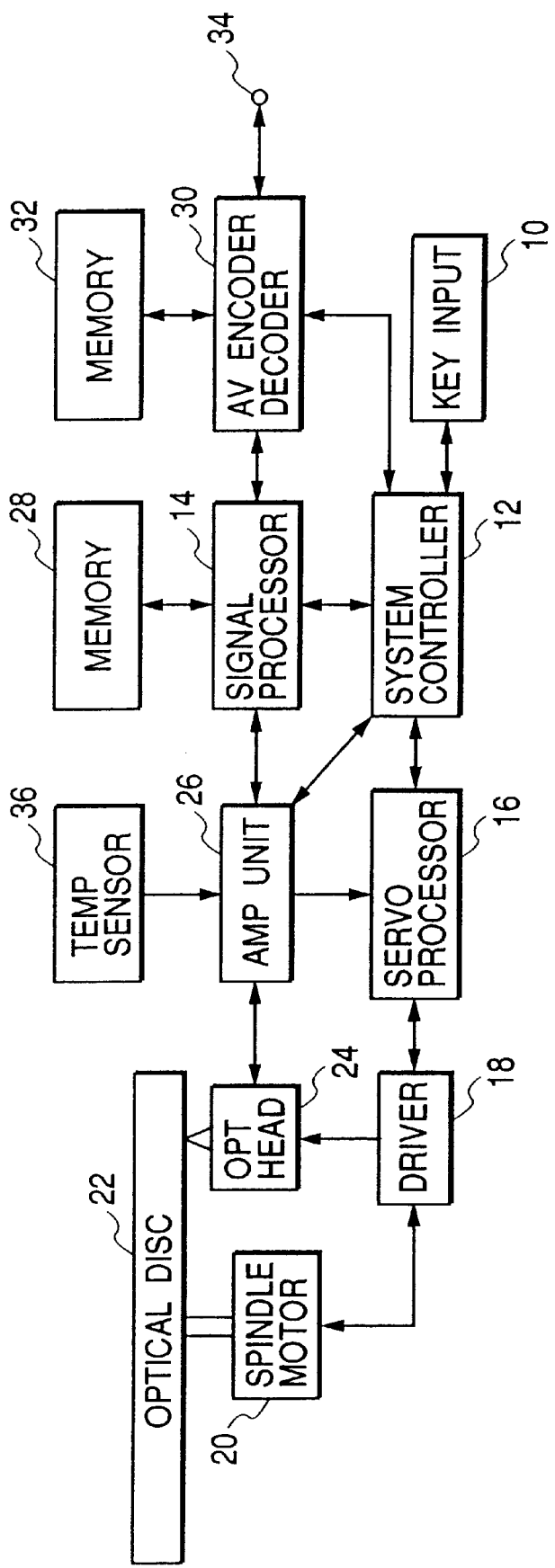
FIG. 9 is a block diagram of an information-signal recording and reproducing apparatus according to a first embodiment of this invention.

FIG. 9 shows an information-signal recording and reproducing apparatus according to the first embodiment of this invention. The apparatus of FIG. 9 operates on a rewritable optical disc such as a DVD-RW. The DVD-RW is driven on a CLV basis. The DVD-RW has sectors extending along a spiral recording track. One sector has 16 bytes assigned to an address, and 2,048 bytes assigned to data. Regarding the DVD-RW, one ECC block having 16 sectors is a minimum unit of error correction. Also, one ECC block is a minimum unit for signal reproduction from and signal recording on the DVD-RW.

Figure 10:
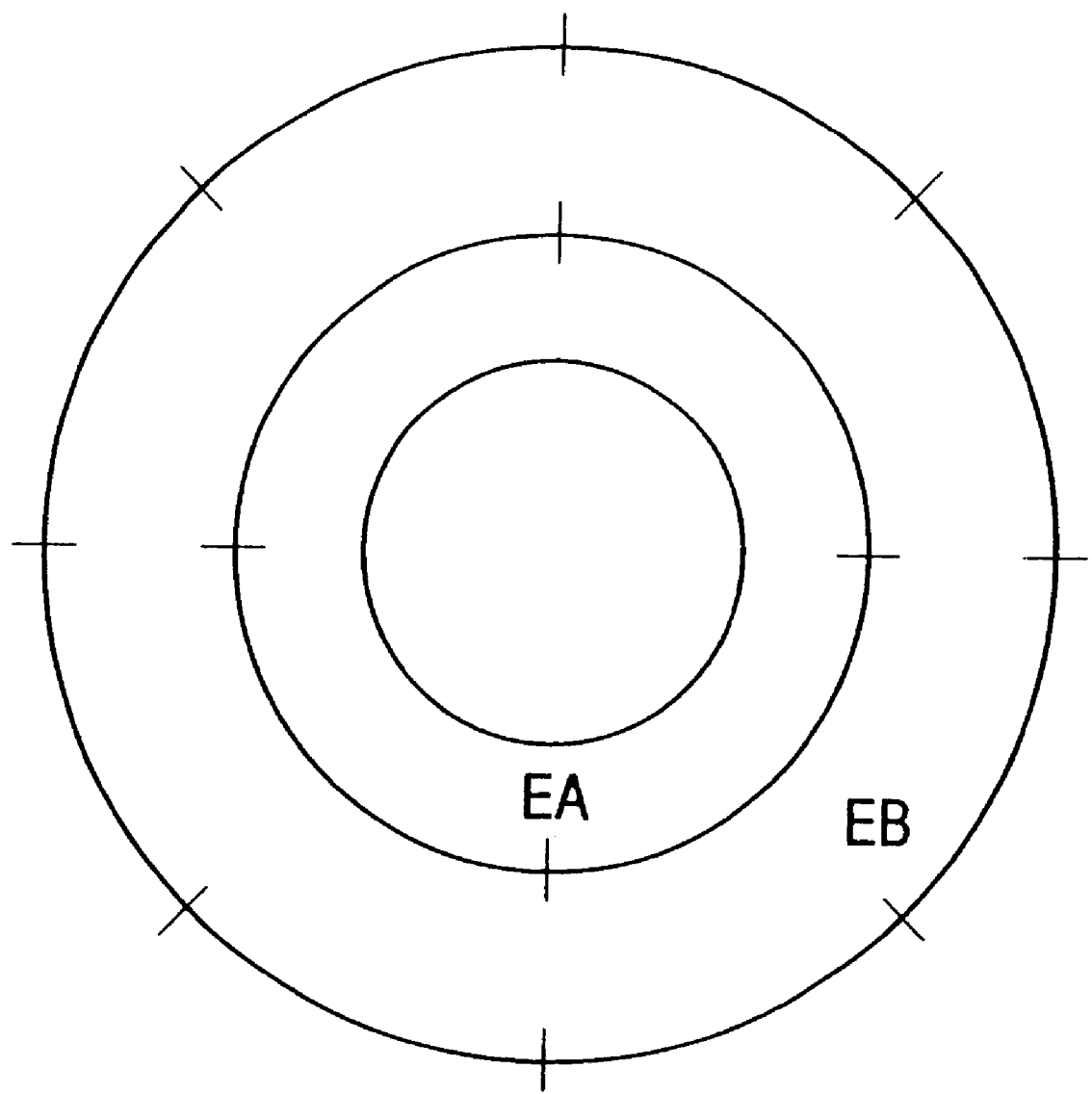
FIG. 10 is a diagrammatic plan view of an optical disc.

As shown in FIG. 10, the DVD-RW is divided into an inner area EA and an outer area EB. When the inner edge of the area EA is scanned by a laser beam, the period of rotation of the disc is equal to about 40 msec. When the outer edge of the area EB is scanned by the laser beam, the period of rotation of the disc is equal to about 80 msec.

The DVD-RW in FIG. 10 may be designed as follows. In the inner area EA, 2 ECC blocks each having 16 sectors compose a general 1-unit corresponding block (a general reproduction and recording unit). In the outer area EB, 4 ECC blocks compose a general 1-unit corresponding block (a general reproduction and recording unit).

The apparatus of FIG. 9 includes a key input unit 10, a system controller 12, a signal processor 14, a servo processor 16, a driver 18, a spindle motor 20, an optical head (optical pickup) 24, an amplifier unit 26, a memory 28, an audio-video encoding and decoding unit 30, a memory 32, an input/output terminal 34, and a temperature sensor 36.

The spindle motor 20 acts to rotate a rewritable optical disc 22 such as a DVD-RW. While the spindle motor 20 rotates the optical disc 22, the optical head 24 writes and reads information thereon and therefrom. The spindle motor 20 is connected to the driver 18. The optical head 24 is connected to the amplifier unit 26 and the driver 18. The amplifier unit 26 is connected to the servo processor 16 and the signal processor 14. The driver 18 is connected to the servo processor 16. The signal processor 14 is connected to the memory 28 and the audio-video encoding and decoding unit 30. The audio-video encoding and decoding unit 30 is connected to the memory 32 and the input/output terminal 34. The system controller 12 is connected to the key input unit 10, the signal processor 14, the servo processor 16, the amplifier unit 26, and the audio-video encoding and decoding unit 30. The temperature sensor 36 is located near the optical disc 22 placed in position within the apparatus. The temperature sensor 36 detects an ambient temperature of the optical disc 22. The temperature sensor 36 is connected to the amplifier unit 26.

The spindle motor 20 is driven and controlled by the driver 18. The spindle motor 20 rotates the optical disc 22. The spindle motor 20 is provided with an FG generator and a rotational position sensor (an angular position sensor). The rotational position sensor includes, for example, a Hall element. The FG generator outputs an FG signal (a rotational speed signal). The Hall element outputs a rotational position signal. The FG signal and the rotational position signal are fed back to the driver 18.

The optical head 24 faces the optical disc 22 placed in position within the apparatus. A feed motor (not shown) moves the optical head 24 radially with respect to the optical disc 22. The feed motor is driven by the driver 18. The optical head 24 includes a semiconductor laser, a collimator lens, and an objective lens. The semiconductor laser acts as a source for emitting a light beam (a laser beam). The emitted laser beam is focused into a laser spot on the optical disc 22 by the collimator lens and the objective lens. The optical head 24 includes a 2-axis actuator for driving the objective lens to implement focusing and tracking of the laser spot with respect to the optical disc 22. The semiconductor laser is driven by a laser drive circuit in the amplifier unit 26. In the case where an information signal such as an audio signal or an audio-video signal is recorded, the information signal is subjected to waveform correction by a waveform correction circuit in the amplifier unit 26 before being fed to the laser drive circuit. The 2-axis actuator is driven by the driver 18.

The key input unit 10 includes a plurality of keys which can be operated by a user. The key input unit 10 generates command signals in accordance with its operation by the user. The command signals are transmitted from the key input unit 10 to the system controller 12. The command signals include a command signal for starting a recording mode of operation of the apparatus, and a command signal for starting a playback mode of operation of the apparatus. The key input unit 10 generates control data in accordance with its operation by the user. The control data are transmitted from the key input unit 10 to the system controller 12.

The system controller 12 includes, for example, a microcomputer or a similar device which operates in accordance with a program stored in its internal ROM. The system controller 12 controls the signal processor 14, the servo processor 16, the amplifier unit 26, and the audio-video encoding and decoding unit 30 in response to the command signals fed from the key input unit 10.

Control data can be fed to the system controller 12 via an input terminal (not shown). The control data fed to the system controller 12 via the input terminal, and the control data fed to the system controller 12 from the key input unit 10 include a signal for adjusting the resolution of pictures represented by contents information to be recorded, a signal for separating quickly-moving scenes such as car racing scenes represented by contents information, and a signal for giving priority to a recording time. The system controller 12 changes an actual recording time in accordance with the control data. The change of the actual recording time is implemented by changing, for example, a data compression rate used by the audio-video encoding and decoding unit 30. The system controller 12 enables the setting of the actual recording time to be selected by the user.

When the apparatus is required to start to operate in the playback mode, the key input unit 10 is actuated to generate the playback start command signal. The playback start command signal is transmitted from the key input unit 10 to the system controller 12. The system controller 12 controls the servo processor 16 and the amplifier unit 26 in response to the playback start command signal, thereby starting the playback mode of operation of the apparatus. The control of the servo processor 16 includes steps of controlling the driver 18. Firstly, the system controller 12 starts rotation of the optical disc 22 and application of a laser spot thereon through the control of the driver 18. The optical head 24 is controlled by the driver 18, thereby reading out address information from the optical disc 22. The readout address information is transmitted from the optical head 24 to the system controller 12 via the amplifier unit 26. The system controller 12 finds or decides a target sector (a target track portion) to be played back by referring to the address information. The system controller 12 controls the optical head 24 via the servo processor 16, the driver 18, and the feed motor, thereby moving the optical head 24 radially with respect to the optical disc 22 and hence moving the laser spot to the target sector on the optical disc 22. When the movement of the laser spot to the target sector is completed, the system controller 12 operates to start the reproduction of a signal from the target sector on the optical disc 22. In this way, the playback mode of operation of the apparatus is started. During the playback mode of operation of the apparatus, the target sector is repetitively changed from one to another.

During the playback mode of operation of the apparatus, the optical head 24 scans the optical disc 22 and generates a reproduced RF signal containing information read out therefrom. The optical head 24 outputs the RF signal to the amplifier unit 26. The amplifier unit 26 enlarges the RF signal from the optical head 24. The amplifier unit 26 generates a main reproduced signal from the enlarged RF signal. In addition, the amplifier unit 26 generates a servo error signal (tracking and focusing servo error signals) from the output signal of the optical head 24. The amplifier unit 26 includes an equalizer for optimizing the frequency aspect of the main reproduced signal. Also, the amplifier unit 26 includes a PLL (phase locked loop) circuit for extracting a bit clock signal from the equalized main reproduced signal, and for generating a speed servo signal from the equalized main reproduced signal. Furthermore, the amplifier unit 26 includes a jitter generator for comparing the time bases of the bit clock signal and the equalized main reproduced signal, and for detecting jitter components from the results of the time-base comparison. A signal of the detected jitter components is transmitted from the amplifier unit 26 to the system controller 12.

The tracking and focusing servo signals and the speed servo signal are transmitted from the amplifier unit 26 to the servo processor 16. The equalized main reproduced signal is transmitted from the amplifier unit 26 to the signal processor 14.

The servo processor 16 receives the speed servo signal and the tracking and focusing servo signals from the amplifier unit 26. The servo processor 16 receives the rotation servo signals from the spindle motor 20 via the driver 18. In response to these servo signals, the servo processor 16 implements corresponding servo control processes.

Specifically, the servo processor 16 generates a rotation control signal on the basis of the speed servo signal and the rotation servo signals. The rotation control signal is transmitted from the servo processor 16 to the spindle motor 20 via the driver 18. The spindle motor 20 rotates at a speed depending on the rotation control signal. The rotation control signal is designed to rotate the optical disc 22 at a selected constant linear velocity or a given constant linear velocity.

In addition, the servo processor 16 generates servo control signals on the basis of the focusing and tracking servo signals. The servo control signals are transmitted from the servo processor 16 to the 2-axis actuator in the optical head 22 via the driver 18. The 2-axis actuator controls the laser spot on the optical disc 22 in response to the servo control signals, and thereby implements focusing and tracking of the laser spot with respect to the optical disc 22.

During the playback mode of operation of the apparatus, the signal processor 14 receives the main reproduced signal from the amplifier unit 26. The signal processor 14 is controlled by the system controller 12, thereby converting the main reproduced signal into a corresponding reproduced digital signal. The signal processor 14 detects a sync signal from the reproduced digital signal. The signal processor 14 decodes an 8-16 modulation-resultant signal of the reproduced digital signal into NRZ data, that is, non-return-to-zero data. The signal processor 14 subjects the NRZ data to an error correction process for every correction block (every ECC block), thereby generating a sector address signal and first and second information signals. The sector address signal represents the address of a currently-accessed sector on the optical disc 22. The sync signal and the sector address signal are fed from the signal processor 14 to the system controller 12.

During the playback mode of operation of the apparatus, the signal processor 14 temporarily stores the first and second information signals in the memory 28. Thus, the signal processor 14 writes the first and second information signals into the memory 28, and reads the first and second information signals therefrom. Writing and reading the first and second information signals into and from the memory 28 are controlled to absorb a time-domain change in the transfer rates of the first and second information signals. The memory 28 includes, for example, a D-RAM having a capacity of 64 Mbytes. The signal processor 14 outputs the readout signal (the first and second information signals read out from the memory 28) to the audio-video encoding and decoding unit 30.

In the case where the first and second information signals fed from the memory 28 via the signal processor 14 are compressed data (for example, MPEG2 data) in which audio data and video data are multiplexed, the audio-video encoding and decoding unit 30 separates the first and second information signals into compressed audio data and compressed video data. The audio-video encoding and decoding unit 30 expands and decodes the compressed audio data into non-compressed audio data. In addition, the audio-vide encoding and decoding unit 30 expands and decodes the compressed video data into non-compressed video data. During the expansively decoding process, the audio-video encoding and decoding unit 30 temporarily stores signals and data in the memory 32. The memory 32 includes, for example, a D-RAM having a capacity of 64 Mbytes. The audio-video encoding and decoding unit 30 converts the non-compressed audio data into a corresponding analog audio signal through digital-to-analog conversion. Also, the audio-video encoding and decoding unit 30 converts the non-compressed video data into a corresponding analog video signal through digital-to-analog conversion. The audio-video encoding and decoding unit 30 applies the analog audio signal and the analog video signal to the input/output terminal 34. The analog audio signal and the analog video signal are transmitted to an external via the input/output terminal 34.

The data rate of the expansively decoding process by the audio-video encoding and decoding unit 30, that is, the data transfer rate (the data transmission rate) in the expansively decoding process, is equalized to an expansion data rate which is set in accordance with the type of the related recording mode of operation of the apparatus. Specifically, the audio-video encoding and decoding unit 30 can implement the expansively decoding process at an expansion data rate which can be changed among plural different expansion data rates. The audio-video encoding and decoding unit 20 selects one from among the plural different expansion data rates as a desired expansion data rate in accordance with the type of the related recording mode of operation of the apparatus. The audio-video encoding and decoding unit 30 executes the expansively encoding process at the desired expansion data rate. Information of the type of the recording mode of operation of the apparatus is recorded on the optical disc 22 as control data. During an initial stage of the playback of the optical disc 22, the control data are read out therefrom before being transmitted to the system controller 12. The system controller 12 sets the expansion data rate in the audio-video encoding and decoding unit 30 in accordance with the control data.

When the apparatus is required to start to operate in the recording mode, the key input unit 10 is actuated to generate the recording start command signal. The recording start command signal is transmitted from the key input unit 10 to the system controller 12. The system controller 12 controls the servo processor 16 and the amplifier unit 26 in response to the recording start command signal, thereby starting the recording mode of operation of the apparatus. The control of the servo processor 16 includes steps of controlling the driver 18. Firstly, the system controller 12 starts rotation of the optical disc 22 and application of a laser spot thereon through the control of the driver 18. The optical head 24 is controlled by the driver 18, thereby reading out address information from the optical disc 22. The readout address information is transmitted from the optical head 24 to the system controller 12 via the amplifier unit 26. The system controller 12 finds or decides a target sector (a target track portion), on which a signal is to be recorded, by referring to the address information. The system controller 12 controls the optical head 24 via the servo processor 16 and the driver 18, thereby moving the laser spot to the target sector on the optical disc 22. During the recording mode of operation of the apparatus, the target sector is repetitively changed from one to another.

During the recording mode of operation of the apparatus, an audio signal and a video signal to be recorded are fed via the input/output terminal 34 to the audio-video encoding and decoding unit 30. The audio-video encoding and decoding unit 30 converts, the audio signal into corresponding audio data through analog-to-digital conversion. In addition, the audio-video encoding and decoding unit 30 converts the video signal into corresponding video data through analog-to-digital conversion. The audio-video encoding and decoding unit 30 compressively encodes the audio data and the video data into compressed audio data and compressed video data (for example, MPEG2 audio data and MPEG2 video data) at a rate depending on the type of the recording mode. The audio-video encoding and decoding unit 30 multiplexes the compressed audio data and the compressed video data to form multiplexed contents data. The audio-vide encoding and decoding unit 30 outputs the multiplexed contents data to the signal processor 14. The data rate of the compressively encoding process by the audio-video encoding and decoding unit 30, that is, the data transmission rate in the compressively encoding process, is equalized to a compression data rate which is selected from among plural different rates in accordance with the type of the recording mode of operation of the apparatus. During the compressively encoding process, the audio-video encoding and decoding unit 30 temporarily stores data in the memory 32.

During the recording mode of operation of the apparatus, the signal processor 14 adds error correction code signals (ECC signals or P1 and P0 signals) to the multiplexed contents data. The signal processor 12 subjects the ECC-added data to NRZ and 8-16 modulation encoding processes. The signal processor 14 adds a sync signal to the encoding-resultant contents data to form sync-added contents data. The sync signal is fed from the system controller 12. The sync-added contents data are temporarily stored in the memory 28. The sync-added contents data are read out from the memory 28 at a data rate corresponding to a data rate of signal recording on the optical disc 22. The signal processor 14 subjects the readout contents data to given modulation for record. The signal processor 14 outputs the modulation-resultant signal to the amplifier unit 26. The output signal of the signal processor 14 is an 8-16 modulation-resultant signal. The amplifier unit 26 corrects the waveform of the output signal of the signal processor 14. The amplifier unit 26 generates a laser drive signal in response to the waveform-correction-resultant signal. The amplifier unit 26 outputs the laser drive signal to the optical head 24. The optical head 24 records the output signal of the amplifier unit 26 on the target sector (the target track portion) on the optical disc 22.

Figure 11:
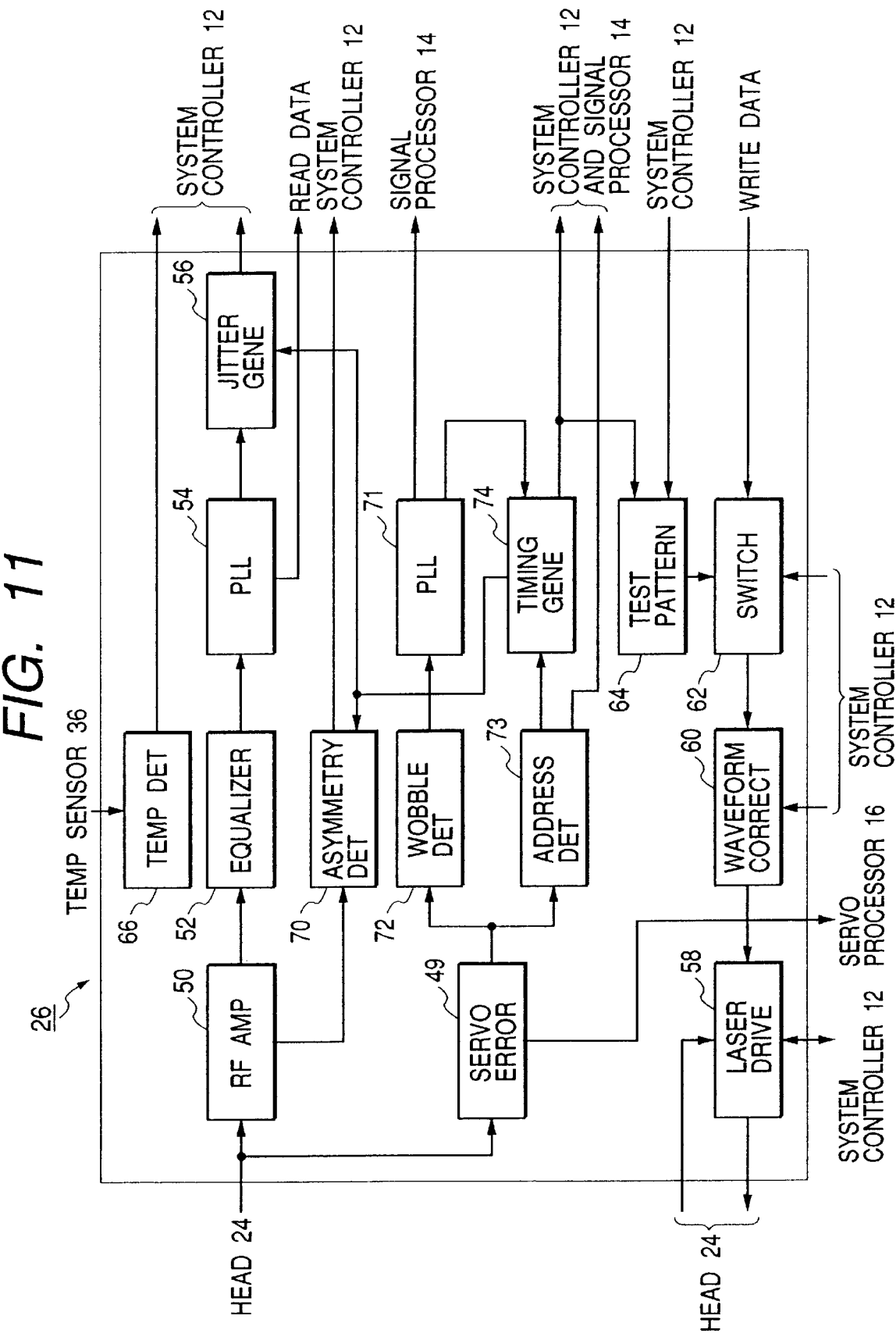
FIG. 11 is a block diagram of an amplifier unit in FIG. 9.

As shown in FIG. 11, the amplifier unit 26 includes a servo error signal generation circuit 49, an RF amplifier 50, an equalizer 52, a PLL circuit 54, a jitter signal generation circuit 56, a laser drive circuit 58, a waveform correction circuit 60, a switch 62, a test pattern generation circuit 64, a temperature detection circuit 66, an asymmetry detection circuit 70, a PLL circuit 71, a wobble detection circuit 72, an address detection circuit 73, and a timing signal generation circuit 74.

The servo error signal generation circuit 49 is connected to the optical head 24, the servo processor 16, the wobble detection circuit 72, and the address detection circuit 73. The wobble detection circuit 72 is connected to the PLL circuit 71. The PLL circuit 71 is connected to the timing signal generation circuit 74 and the signal processor 14. The address detection circuit 73 is connected to the timing signal generation circuit 74, the system controller 12, and the signal processor 14. The timing signal generation circuit 74 is connected to the jitter signal generation circuit 56, the asymmetry detection circuit 70, the test pattern generation circuit 64, the system controller 12, and the signal processor 14.

The RF amplifier 50 is connected to the optical head 24, the equalizer 52, and the asymmetry detection circuit 70. The equalizer 52 is connected to the PLL circuit 54. The PLL circuit 54 is connected to the jitter signal generation circuit 56 and the signal processor 14. The jitter signal generation circuit 56 is connected to the system controller 12. The asymmetry detection circuit 70 is connected to the system controller 12.

The switch 62 is connected to the waveform correction circuit 60, the test pattern generation circuit 64, the system controller 12, and the signal processor 14. The test pattern generation circuit 64 is connected to the system controller 12. The waveform correction circuit 60 is connected to the laser drive circuit 58 and the system controller 12. The laser drive circuit 58 is connected to the optical head 24 and the system controller 12. The temperature detection circuit 66 is connected to the temperature sensor 36 and the system controller 12. The temperature detection circuit 66 is an interface between the temperature sensor 36 and the system controller 12. A signal representative of the ambient temperature of the optical disc 22 is transmitted from the temperature sensor 36 to the system controller 12 via the temperature detection circuit 66. The temperature sensor 36 may be replaced by a temperature-responsive semiconductor such as a temperature-responsive diode provided in the amplifier unit 26. In this case, the temperature detection circuit 66 receives a signal generated by the temperature-responsive semiconductor.

The amplifier unit 26 operates as follows. The servo error signal generation circuit 49 in the amplifier unit 26 produces a servo error signal from the output signal of the optical head 24. The servo error signal generation circuit 49 outputs the servo error signal to the servo processor 16. During the playback mode of operation of the apparatus, the RF amplifier 50 enlarges the output signal of the optical head 24. The RF amplifier 50 outputs the enlarged signal to the equalizer 52 and the asymmetry detection circuit 70. The equalizer 52 optimizes the frequency aspect of the enlarged signal. The equalizer 52 outputs the resultant signal to the PLL circuit 54. The PLL circuit 54 subjects the output signal of the equalizer 52 to PLL control, thereby generating reproduced data (read data), a bit clock signal, and a speed servo signal (a signal representing the rotational speed of the optical disc 22). The PLL circuit 54 outputs the reproduced data (the read data) to the jitter signal generation circuit 56 and the signal processor 14. The PLL circuit 54 outputs the bit clock signal to the jitter signal generation circuit 56. The PLL circuit 54 outputs the speed servo signal to the servo processor 16. The jitter signal generation circuit 56 compares the time bases of the reproduced data and the bit clock signal, thereby detecting jitter components and generating a signal of the detected jitter components. The jitter signal generation circuit 56 outputs the signal of the jitter components to the system controller 12. The timing of the jitter detection by the jitter signal generation circuit 56 is controlled by the timing signal generation circuit 74.

The output signal of the RF amplifier 50 contains a reproduced 8-16 modulation-resultant signal during the playback mode of operation of the apparatus. The asymmetry detection circuit 70 decides, from the output signal of the RF amplifier 50, the position of the center of a shortest-period signal "3 T" relative to the peak and bottom amplitude positions of a longest-period signal "11 T" of the reproduced 8-16 modulation-resultant signal. The asymmetry detection circuit 70 informs the system controller 12 of the decision result as a detected asymmetry value. The decision by the asymmetry detection circuit 70 corresponds to the detection of an asymmetry. The timing of the asymmetry detection by the asymmetry detection circuit 70 is controlled by the timing signal generation circuit 74. The wobble detection circuit 72 generates a wobble signal (a frequency signal) from an output signal of the servo error signal generation circuit 49. The wobble detection circuit 72 outputs the wobble signal to the PLL circuit 71. The PLL circuit 71 generates a spindle speed signal and a recording clock signal in response to the wobble signal. The PLL circuit 71 outputs the spindle speed signal and the recording clock signal to the timing signal generation circuit 74 and the system controller 12. The address generation circuit 73 produces a signal of an address on the optical disc 22 and a recording/reproduction timing signal (a land pre-pit signal or an LPP signal) in response to the output signal of the servo error signal generation circuit 49. The address generation circuit 73 outputs the recording/reproduction timing signal to the timing signal generation circuit 74. The address generation circuit 73 outputs the address signal and the recording/reproduction timing signal to the system controller 12 and the signal processor 14. The timing signal generation circuit 74 produces a reproduction timing signal in response to the output signals from the PLL circuit 71 and the address detection circuit 73. The timing signal generation circuit 74 outputs the reproduction timing signal to the jitter signal generation circuit 56 and the asymmetry detection circuit 70, thereby controlling the timing of the jitter detection by the jitter signal generation circuit 56 and the timing of the asymmetry detection by the asymmetry detection circuit 70.

The laser drive circuit 58 in the amplifier unit 26 generates a laser drive signal. The laser drive circuit 58 outputs the laser drive signal to the semiconductor laser within the optical head 24. The semiconductor laser emits the laser beam in response to the laser drive signal. The optical head 24 includes a photodiode exposed to a portion of the laser beam emitted by the semiconductor laser. The photodiode monitors the laser beam. The photodiode is also referred to as the monitor diode. The photodiode generates a signal representing the intensity (or the power) of the laser beam. The photodiode feeds the laser intensity signal back to the laser drive circuit 58 in the amplifier unit 26. The laser drive circuit 58 controls the laser drive signal in response to the laser intensity signal. The semiconductor laser, the photodiode, and the laser drive circuit 58 compose an APC (automatic power control) circuit for regulating the power of the laser beam at a desired level controlled by the system controller 12. The APC can be selectively enabled and disabled by the system controller 12. For example, the APC is enabled during the playback mode of operation of the apparatus, and is disabled during the recording mode of operation of the apparatus. The laser drive circuit 58 transmits the laser intensity signal to an A/D converter within the system controller 12. Thus, the intensity of the laser beam can be monitored by the system controller 12.

During the recording mode of operation of the apparatus, the timing signal generation circuit 74 produces a timing signal. The timing signal generation circuit 74 outputs the timing signal to the test pattern generation circuit 64, the system controller 12, and the signal processor 14. The test pattern generation circuit 64 produces a signal of a test pattern in response to the output signal from the timing signal generation circuit 74 while being controlled by the system controller 12. The test pattern generation circuit 64 outputs the test pattern signal to the switch 62. The switch 62 receives the 8-16 modulation-resultant signal (the write data or the contents data to be recorded) from the signal processor 14. The switch 62 is controlled by the system controller 12, selecting one of the test pattern signal and the 8-16 modulation-resultant signal and outputting the selected signal to the waveform correction circuit 60.

The waveform correction circuit 60 converts the waveform of the output signal of the switch 62 into one of waveforms basically similar to the recording waveform WA and a waveform equivalent to the recording waveform WB. The waveform correction circuit 60 uses waveform correction parameters which determine the recording power level Pp, the erasing power level Pb, and the time intervals Ta, Tb, Tc, and Td in the recording waveform WA. At least one of the waveform correction parameters used by the waveform correction circuit 60 can be changed so that the waveform of the signal generated thereby can be changed among those basically similar to the recording waveform WA. The waveform correction parameters used by the waveform correction circuit 60 can be changed by the system controller 12. The waveforms basically similar to the recording waveform WA are different from each other. Accordingly, these waveforms provide different statuses of the power conditions (the intensity conditions) of the laser beam respectively. One of the different statuses of the power conditions of the laser beam is selected through the control of the waveform correction circuit 60 by the system controller 12.

Figure 29:
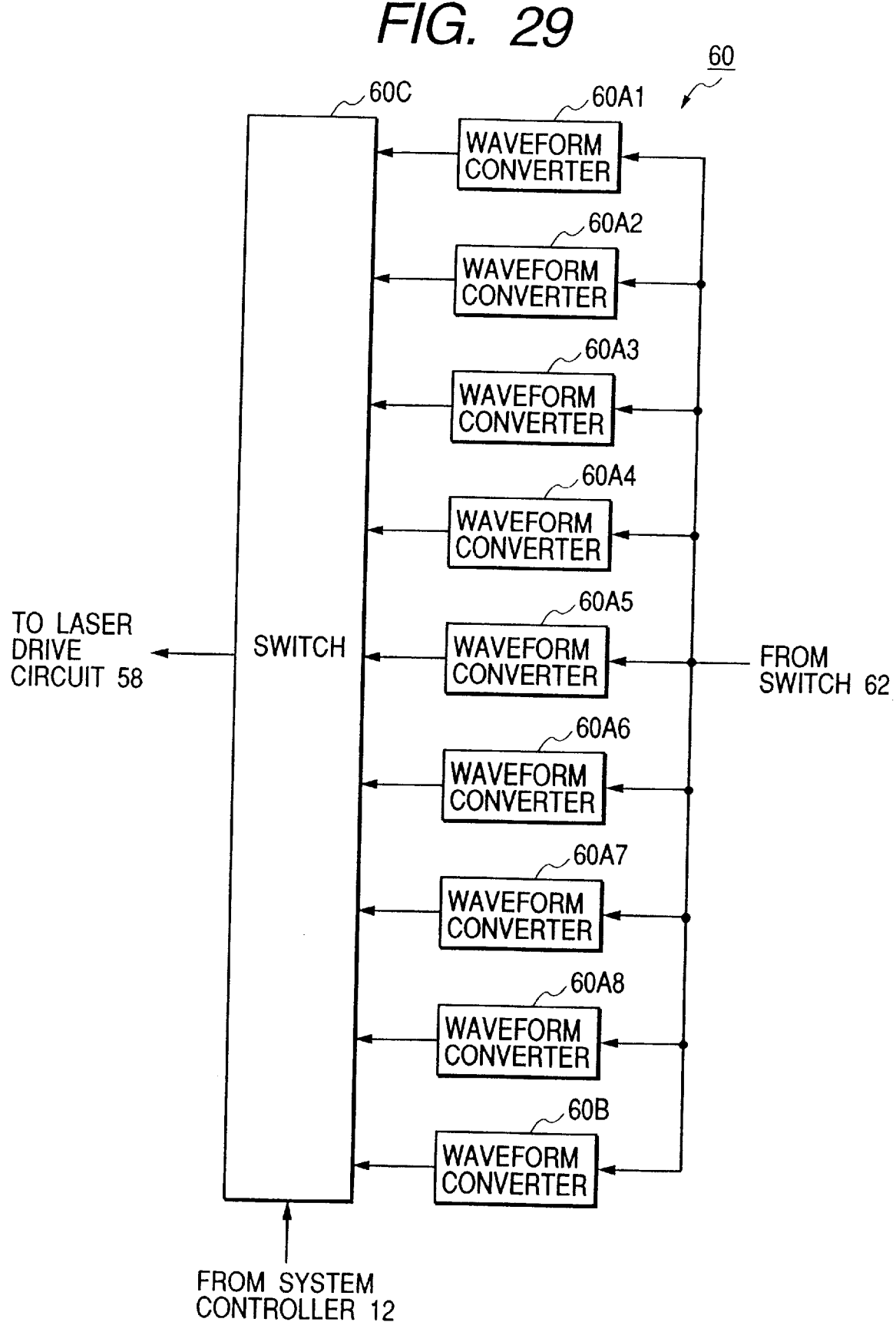
FIG. 29 is a block diagram of a waveform correction circuit in FIG. 11.

FIG. 29 shows an example of the waveform correction circuit 60. The waveform correction circuit 60 in FIG. 29 includes waveform converters 60A1, 60A2, 60A3, 60A4, 60A5, 60A6, 60A7, 60A8, and 60B, and a switch 60C. The input terminals of the waveform converters 60A1–60A8, and 60B are connected to the switch 62 (see FIG. 11). The output terminals of the waveform converters 60A1–60A8, and 60B are connected to the switch 60C. The switch 60C is connected to the laser drive circuit 58 (see FIG. 11). The switch 60C has a control terminal connected to the system controller 12 (see FIG. 9).

The waveform converters 60A1–60A8 in the waveform correction circuit 60 change the output signal of the switch 62 into pulse train signals having waveforms basically similar to the recording waveform WA (see FIG. 3). The waveform converters 60A1–60A8 output the pulse train signals to the switch 60C. The pulse train signals generated by the waveform converters 60A1–60A8 are different from each other in at least one of waveform correction parameters. The waveform correction parameters include a parameter determining the recording power level Pp of the laser beam, a parameter determining the erasing power level Pb of the laser beam, a parameter determining the time interval Ta, a parameter determining the time interval Tb, a parameter determining the time interval Tc, and a parameter determining the time interval Td (see FIG. 3). The recording power level Pp, the erasing power level Pb, and the time intervals Ta, Tb, Tc, and Td vary as the values of the waveform correction parameters change. The power conditions (the intensity conditions) of the laser beam depend on the recording power level Pp, the erasing power level Pb, and the time intervals Ta, Tb, Tc, and Td. Accordingly, the waveform converters 60A1, 60A2, 60A3, 60A4, 60A5, 60A6, 60A7, and 60A8 correspond to eight different statuses P1, P2, P3, P4, P5, P6, P7, and P8 of the power conditions of the laser beam, respectively. As understood from the previous description, the waveform converters 60A1–60A8 have respective eight different sets of the waveform correction parameters. Each of the waveform converters 60A1–60A8 may use a known circuit.

The waveform converter 60B in the waveform correction circuit 60 changes the output signal of the switch 62 into a pulse signal having a waveform equivalent to the recording waveform WB (see FIG. 3). The waveform converter 60B includes a pulse-width shortening circuit. Specifically, the waveform converter 60B includes a delay element and an AND circuit. The delay element defers the output signal of the switch 62. The AND circuit executes AND operation between the output signal of the delay element and the output signal of the switch 62, thereby generating the pulse signal. The waveform converter 60B outputs the pulse signal to the switch 60C.

The switch 60C in the waveform correction circuit 60 selects one from among the output signals of the waveform converters 60A1–60A8, and 60B in response to a control signal fed from the system controller 12. The switch 60C transmits the selected signal to the laser drive circuit 58. The laser drive circuit 58 converts the selected signal into a corresponding laser drive signal. When the switch 60C selects one of the output signals of the waveform converters 60A1–60A8, the laser beam emitted by the semiconductor laser has a waveform basically similar to the recording waveform WA (see FIG. 3). At this time, the power conditions (the intensity conditions) of the laser beam agree with one of the eight different statuses P1–P8 which corresponds to the waveform-converter output signal selected by the switch 60C. Thus, the power conditions of the laser beam can be changed among the eight different statuses P1–P8 as the switch 60C is controlled by the system controller 12 to sequentially select one of the output signals of the waveform converters 60A1–60A8. When the switch 60C selects the output signal of the waveform converter 60B, the laser beam emitted by the semiconductor laser has the recording waveform WB (see FIG. 3).

As will be made clear later, during the recording mode of operation of the apparatus except a short term of the execution of a waveform correction optimizing process, the switch 60C selects one from among the output signals of the waveform converters 60A1–60A8, and 60B which is designated by the system controller 12.

The selection-object designated signal can be changed by the system controller 12 in response to the results of the waveform correction optimizing process. The new designated one of the output signals of the waveform converters 60A1–60A8, and 60B is selected by the switch 60C, and is used during the recording mode of operation of the apparatus which follows the term of the execution of the waveform correction optimizing process.

With reference back to FIG. 11, the switch 62 is controlled by the system controller 12 to provide a time base change in a great unit. The waveform correction circuit 60 responds to the time base change. As will be made clear later, the waveform correction parameters which determine the laser power levels Pp and Pb, and the time intervals Ta, Tb, Tc, and Td (see FIG. 3) and which are used by the waveform correction circuit 60 are set so as to optimize the asymmetry value (or the asymmetry value and the jitter value).

Figure 12:
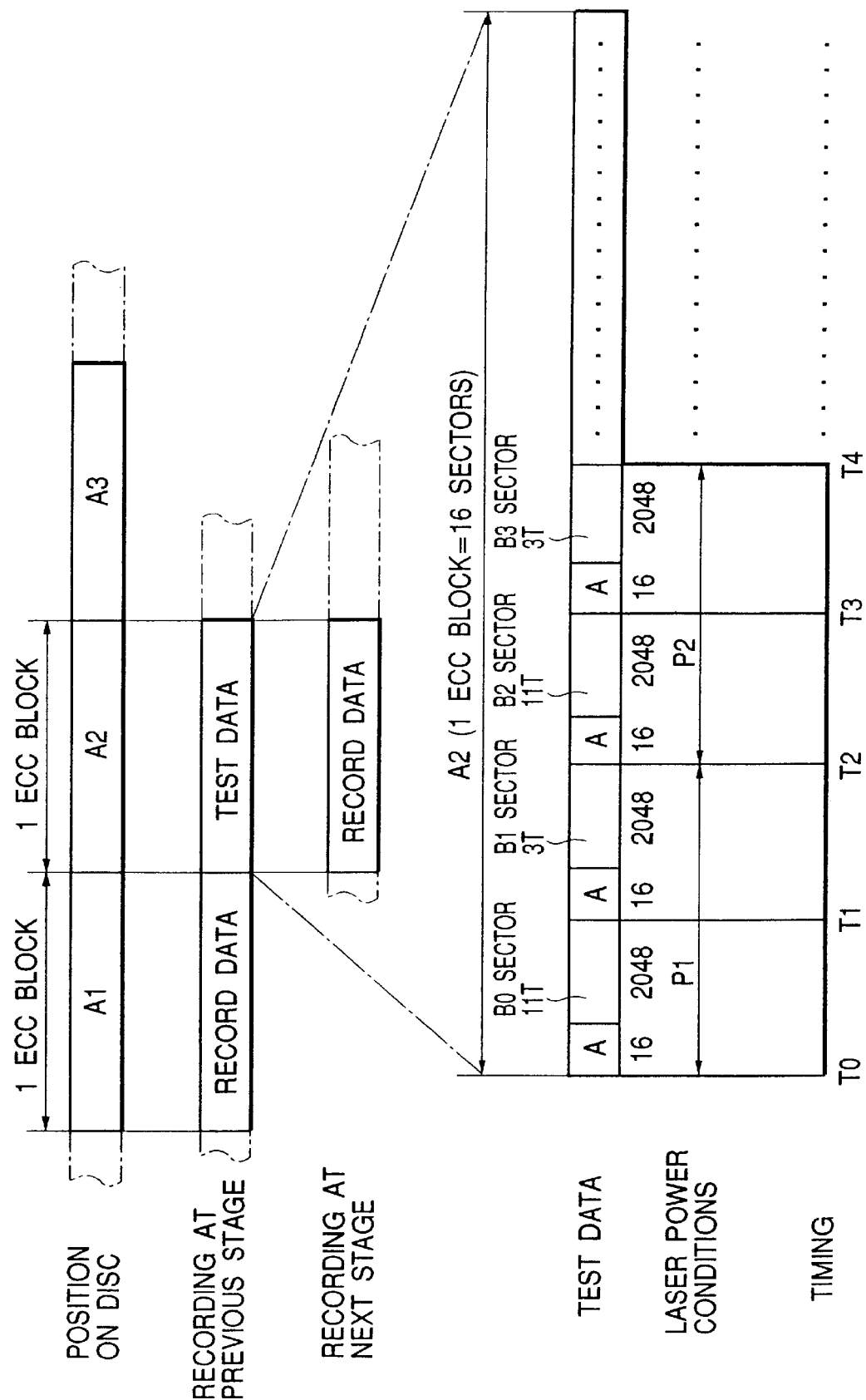
FIG. 12 is a diagram of addresses on an optical disc, and data recorded on the disc.

The test pattern signal generated by the test pattern generation circuit 64 has the alternation of the lowest-frequency signal (the longest-period signal) "11 T" and the highest-frequency signal (the shortest-period signal) "3 T" of the 8-16 modulation-resultant signal. With reference to FIG. 12, the test pattern signal is selected by the switch 62 for a time interval corresponding to one ECC block. Test data originating from the test pattern signal are recorded on an ECC block having an address A2. The ECC block is composed of 16 successive sectors. The ECC block loaded with the test data is also referred to as the test ECC block. The lowest-frequency signal "11 T" is recorded on the first sector, that is, the B0 sector in the test ECC block. The highest-frequency signal "3 T" is recorded on the second sector, that is, the B1 sector in the test ECC block. The lowest-frequency signal "11 T" is recorded on the third sector, that is, the B2 sector in the test ECC block. The highest-frequency signal "3 T" is recorded on the fourth sector, that is, the B3 sector in the test ECC block. Similarly, the lowest-frequency signal "11 T" and the highest-frequency signal "3 T" are alternately recorded on the fifth and later sectors in the test ECC block. Thus, eight sets of the lowest-frequency signal "11 T" and the highest-frequency signal "3 T" are assigned to eight pairs of two successive sectors, respectively. During the recording of the test data, the system controller 12 changes the switch 60C within the waveform correction circuit 60 so that the power conditions (the intensity conditions) of the laser beam are changed among the eight different statuses P1, P2, . . . , and P8. The eight power statuses P1, P2, . . . , and P8 are used for the eight sets of the lowest-frequency signal "11 T" and the highest-frequency signal "3 T", respectively.

During the playback mode of operation of the apparatus, the system controller 12 detects an access to the test ECC block. The timing signal generation circuit 74 produces timing pulses T0, T1, T2, T3, corresponding to the front ends of the sectors in the test ECC block respectively (see FIG. 12). The asymmetry detection circuit 70 samples and holds the output signal of the RF amplifier 50 in response to the timing pulses T0, T1, T2, T3, . . . fed from the timing signal generation circuit 74. Specifically, the asymmetry detection circuit 70 samples and holds a peak PDP1 and a bottom PDB1 of the lowest-frequency signal "11 T" reproduced from the B0 sector in the test ECC block. The asymmetry detection circuit 70 samples and holds a center level PDC1 of the highest-frequency signal "3 T" reproduced from the B1 sector in the test ECC block. Similarly, the asymmetry detection circuit 70 samples and holds peaks and bottoms of the lowest-frequency signals "11 T" and center levels of the highest-frequency signals "3 T" reproduced from the later sectors in the test ECC block. Thus, a peak and a bottom PDB1 of the lowest-frequency signal "11 T", and a center level of the highest-frequency signal "3 T" are detected for each of the eight different-power sets of the lowest-frequency signal "11 T" and the highest-frequency signal "3 T". The asymmetry detection circuit 70 converts the sample-and-hold results into digital data representing the detected asymmetries for the respective eight different-power-status sets of the lowest-frequency signal "11 T" and the highest-frequency signal "3 T". The asymmetry detection circuit 70 outputs the asymmetry data to the system controller 12.

During the recording of contents information on the optical disc 22, the system controller 12 sets the disc-scanning linear velocity to one from among different values through the speed control of the spindle motor 20. The different velocity values include 6 m/s corresponding to a recording time of about 2 hours and a high picture quality, 3 m/s corresponding to a recording time of about 4 hours and a normal picture quality, and 1.5 m/s corresponding to a recording time of about 8 hours and a low picture quality.

According to a first example, one of the waveform converters 60A1–60A8 in the waveform correction circuit 60 which provide recording waveforms basically similar to the recording waveform WA (see FIG. 3) is selected as an active waveform converter for disc-scanning linear velocities of 1.5 m/s and 3 m/s. On the other hand, the waveform converter 60B in the waveform correction circuit 60 which provides the recording waveform WB (see FIG. 3) is selected as an active waveform converter for a disc-scanning linear velocity of 6 m/s.

According to a second example, one of the waveform converters 60A1–60A8 in the waveform correction circuit 60 which provide recording waveforms basically similar to the recording waveform WA (see FIG. 3) is selected as an active waveform converter for disc-scanning linear velocities of 1.5 m/s, 3 m/s, and 6 m/s.

The contents-information recording time can be varied by changing not only the disc-scanning linear velocity but also the compression data rate used by the audio-video encoding and decoding unit 30. The transfer rate of the signal recorded on the optical disc 22 is set higher than the transfer rate of the compression-resultant data which corresponds to the highest compression data rate. The difference between the transfer rates is absorbed by the memory 28.

The CLV control of the optical disc 22 may be replaced by CAV control or zone CAV control. In this case, even when an inner-circumference linear velocity and an outer-circumference linear velocity are changed for about 30 zones, the system controller 12 manages address positions on a recording track and sets an actual linear velocity for each of the address positions. In addition, the period T of the bit clock signal is set on the basis of the set linear velocity.

Figure 13:
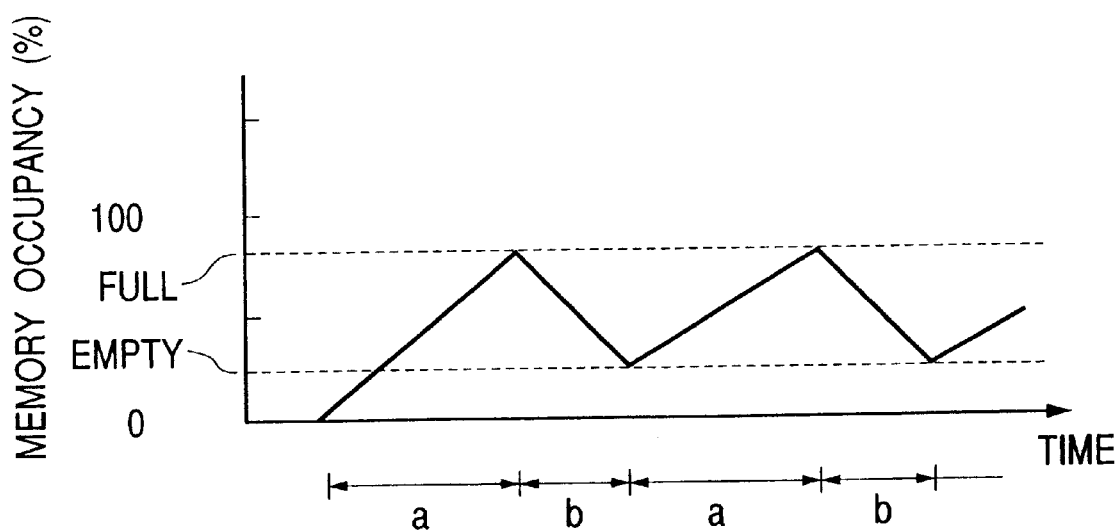
FIG. 13 is a time-domain diagram of the degree of the occupancy of a memory in FIG. 9.

With reference to FIG. 13, time intervals "a" alternate with time intervals "b". During the time intervals "a", a signal is written into the memory 28 at a first transfer rate. During the time intervals "b", the signal is read out from the memory 28 at a second transfer rate higher than the first transfer rate before being recorded on the optical disc 22. The upper side of the occupancy of the memory 28 is limited to a full level. The full level is set in response to the compression data rate or an externally applied signal. After an initial stage, the lower side of the occupancy of the memory 28 is limited to an empty level.

The system controller 12 operates in accordance with a program stored in its internal ROM. According to the program, the system controller 12 decides which of a recording mode, a playback mode, and a waiting mode the required mode of operation of the apparatus is equal to. When the required mode is equal to the recording mode, the program advances to a segment corresponding to the recording mode. When the required mode is equal to the playback mode, the program advances to a segment corresponding to the playback mode. When the required mode is equal to the waiting mode, the program advances to a segment corresponding to the waiting mode.

Figure 14:
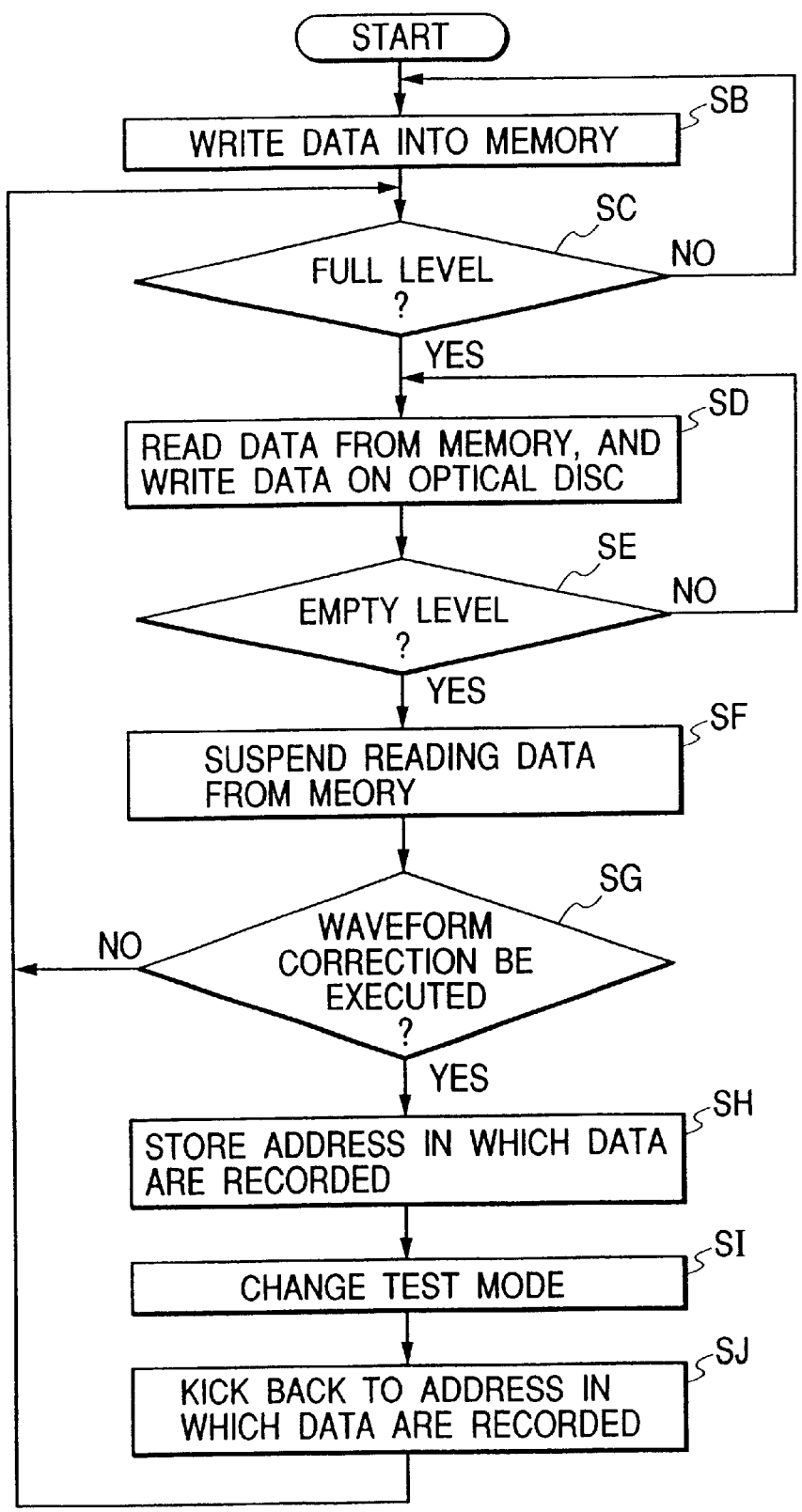
FIG. 14 is a flowchart of a segment of a program for a system controller in FIG. 9.

FIG. 14 is a flowchart of the program segment corresponding to the recording mode. With reference to FIG. 14, a first step SB of the program segment activates the audio-video encoding and decoding unit 30 and the signal processor 14 to generate processing-resultant contents data (processing-resultant audio and video data to be recorded). The first step SB controls the signal processor 14 to write the processing-resultant contents data into the memory 28. After the step SB, the program advances to a step SC.

The step SC decides whether or not the degree of the occupancy of the memory 28 has reached the full level. When the degree of the occupancy of the memory 28 has reached the full level, the program advances from the step SC to a step SD. Otherwise, the program returns from the step SC to the step SB.

The step SD controls the signal processor 14 to read out the contents data from the memory 28. The step SD controls the amplifier unit 26 to transmit the readout contents data from the memory 28 to the optical head 24. The contents data are recorded on the optical disc 22 by the optical head 24.

A step SE following the step SD decides whether or not the degree of the occupancy of the memory 28 has reached the empty level. When the degree of the occupancy of the memory 28 has reached the empty level, the program advances from the step SE to a step SF. Otherwise, the program returns from the step SE to the step SD.

The step SF controls the signal processor 14 to suspend reading out the contents data from the memory 28. After the step SF, the program advances to a step SG.

The step SG decides whether or not a waveform correction optimizing process should be executed. In the case where the waveform correction optimizing process has not been executed yet after the placement of the present optical disc 22 in position within the apparatus, the step SG decides that the waveform correction optimizing process should be executed. On the other hand, in the case where the waveform correction optimizing process has been executed, the step SG decides that the waveform correction optimizing process should not be executed. When it is decided that the waveform correction optimizing process should be executed, the program advances from the step SG to a step SH. When it is decided that the waveform correction optimizing process should not be executed, the program returns from the step SG to the step SC.

The step SH memorizes or stores the address of a position (an ECC block) on the optical disc 22 which should be accessed next for the recording of the contents data.

A block SI following the step SH changes the operation of the apparatus to a test mode to execute the waveform correction optimizing process.

A step SJ subsequent to the block SI returns the operation of the apparatus to the recording mode. The step SJ controls the servo processor 16 in response to the address stored by the step SH so that the optical head 24 will kick back to the position on the optical disc 22 which should be accessed next for the recording of the contents data. After the step SJ, the program returns to the step SC.

It should be noted that the step SG may be omitted from the program segment in FIG. 14. In this case, the step SF is immediately followed by the step SH.

Figure 15:
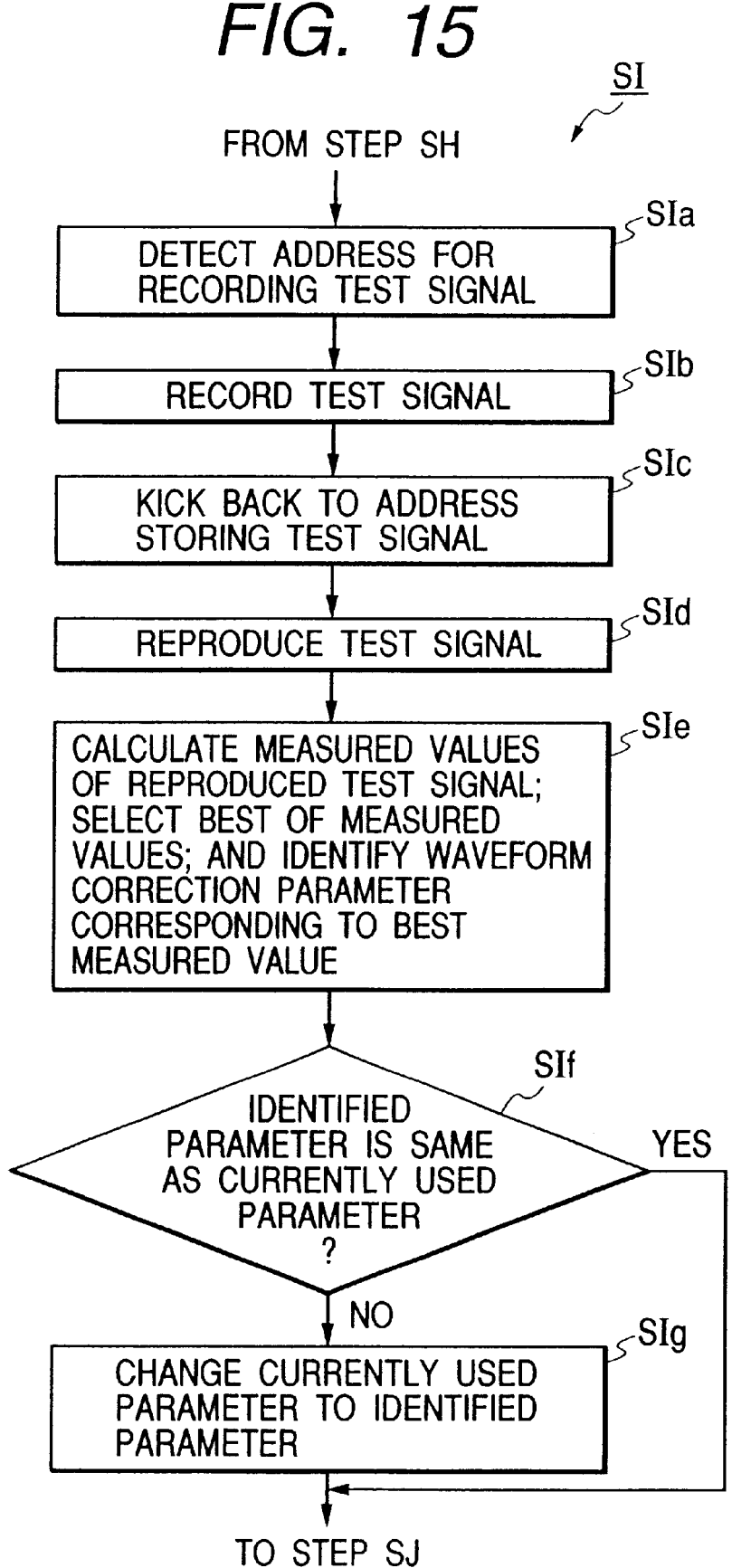
FIG. 15 is a flowchart of a block in FIG. 14.

As shown in FIG. 15, a first step SIa in the block SI detects the address of a position (an ECC block) on the optical disc 22 which immediately follows the address of the last accessed position loaded with the contents data. The ECC block address A2 in FIG. 12 corresponds to the address detected by the step SIa while the ECC block address A1 in FIG. 12 corresponds to the address of the last accessed position loaded with the contents data.

A step SIb subsequent to the step SIa controls the amplifier unit 26 to record the test pattern signal on the disc position (the ECC block) whose address is detected by the step SIa. The ECC block loaded with the test pattern signal is also referred to as the test ECC block. Specifically, the step SIb controls the switch 62 within the amplifier unit 26 to select the test pattern signal fed from the test pattern generation circuit 64.

As previously mentioned, the test pattern signal has the alternation of the lowest-frequency signal (the longest-period signal) "11 T" and the highest-frequency signal (the shortest-period signal) "3 T" of the 8-16 modulation-resultant signal. As shown in FIG. 12, the lowest-frequency signal "11 T" is recorded on the first sector, that is, the B0 sector in the test ECC block. The highest-frequency signal "3 T" is recorded on the second sector, that is, the B1 sector in the test ECC block. The lowest-frequency signal "11 T" is recorded on the third sector, that is, the B2 sector in the test ECC block. The highest-frequency signal "3 T" is recorded on the fourth sector, that is, the B3 sector in the test ECC block. Similarly, the lowest-frequency signal "11 T" and the highest-frequency signal "3 T" are alternately recorded on the fifth and later sectors in the test ECC block. Thus, eight sets of the lowest-frequency signal "11 T" and the highest-frequency signal "3 T" are assigned to eight pairs of two successive sectors, respectively.

The step SIb controls the waveform correction circuit 60 to change the power conditions (the intensity conditions) of the laser beam among the eight different statuses P1, P2, ..., and P8. Specifically, the step SIb changes at least one of the waveform correction parameters in the waveform correction circuit 60 among eight different values. As shown in FIG. 12, the eight power statuses P1, P2, ..., and P8 are used for the eight sets of the lowest-frequency signal "11 T" and the highest-frequency signal "3 T", respectively. The laser-beam power condition change is accorded with one of a monotonically increasing pattern, a monotonically decreasing pattern, a pattern in which the power level is alternately changed between a positive side and a negative side of a predetermined value, a pattern in which the power level is changed in correspondence with the detected temperature, a pattern in which the power level is changed with the record position, predetermined different patterns corresponding to the lapse of time from the previous recording, and different patterns depending on the conditions of the apparatus.

A step SIc following the step SIb controls the servo processor 16 so that the optical head 24 will kick back to the front end of the test ECC block on the optical disc 22. After the step SIc, the program advances to a step SId.

A step SId changes the operation of the apparatus to the playback mode. The step SId controls the optical head 24 via the amplifier unit 26 to reproduce the test pattern signal from the test ECC block. The step SId receives the data from the amplifier unit 26 which represent the detected asymmetries for the respective eight different-power-condition sets of the lowest-frequency signal "11 T" and the highest-frequency signal "3 T". The received asymmetry data contain information of the detected peak and the detected bottom of the lowest-frequency signal "3 T", and the center level of the highest-frequency signal "3 T" for each of the eight different-power-status sets of the lowest-frequency signal "11 T" and the highest-frequency signal "3 T".

A step SIe calculates the error (the deviation or difference) of the center level of the highest-frequency signal "3 T" from the center between the detected peak and the detected bottom of the lowest-frequency signal "11 T" for each of the eight different-power-status sets of the lowest-frequency signal "11 T" and the highest frequency signal "3 T". The step SIe compares the calculated errors, and thereby detects the smallest of the calculated errors. The step SIe selects one from among the eight different-power-status sets of the lowest-frequency signal "11 T" and the highest-frequency signal "3 T" which corresponds to the smallest error. In other words, the step SIe selects one from among the eight different recording power statuses which corresponds to the smallest error. The step SIe identifies the value of the waveform correction parameter (or the values of the waveform correction parameters) in the waveform correction circuit 60 which corresponds to the selected one of the eight different recording power statuses. Specifically, the step SIe identifies one of the waveform converters 60A1–60A8 in the waveform correction circuit 60 which corresponds to the selected one of the eight different recording power statuses.

A step SIf subsequent to the step SIe decides whether or not the identified value of the waveform correction parameter (or the identified values of the waveform correction parameters) is equal to the parameter value which is currently set in the waveform correction circuit 60 for the recording of the contents data. When the identified value is not equal to the. currently-set parameter value, the program advances from the step SIf to a step SIg. When the identified value is equal to the currently-set parameter value, the program jumps from the step SIf to the step SJ in FIG. 14. Specifically, the step SIf decides whether or not the identified waveform converter is the same as that currently set active for the recording of the contents data (the currently designated waveform converter). When the identified waveform converter is the same as that currently set active, the program jumps from the step SIf to the step SJ in FIG. 14. Otherwise, the program advances from the step SIf to the step SIg.

The step SIg updates or changes the waveform correction parameter or parameters in the waveform correction circuit 60 to the identified value or values. Specifically, the step SIg controls the switch 60C in the waveform correction circuit 60 to select the output signal of one of the waveform converters 60A1–60A8 which is the same as the identified waveform converter. The selected waveform-converter output signal is used for later recording of the contents data. After the step SIg, the program advances to the step SJ in FIG. 14.

As shown in FIG. 12, the contents data are recorded on the ECC block at the address A1 by the step SD (see FIG. 14). The test pattern signal is recorded on the ECC block at the address A2 by the step SIb (see FIG. 15). The address A2 immediately follows the address Al. The recording of the contents data on the ECC block at the address A1 is continuously followed by the recording of the test pattern signal on the next ECC block at the address A2. Thus, a waiting time is prevented from occurring between the recording of the contents data and the subsequent recording of the test pattern signal. As previously mentioned, the test pattern signal is reproduced from the ECC block at the address A2 to implement the waveform correction optimizing process. Then, the optical head 24 is moved back to the front end of the ECC block at the address A2. Subsequently, the contents data are recorded on the ECC block at the address A2 by the step SD (see FIG. 14). In this case, the contents data are written over the test pattern signal.

A 0-kilobyte linking method is applied to the connection between the contents data on the neighboring ECC blocks at the addresses A1 and A2. The 0-kilobyte linking method may use that shown in, for example, Japanese published unexamined patent application 2000-137952 or Japanese published unexamined patent application 2000-137948, the disclosure of which is hereby incorporated by reference. According to the 0-kilobyte linking method, the previous contents data and the new contents data are continuously recorded in a manner such that the connection between the previous contents data and the new contents data is located at the boundary between two neighboring ECC blocks. The previous contents data and the new contents data can be continuously reproduced. As previously mentioned, the new contents data are written over the test pattern signal. Since the test pattern signal and the new contents data are recorded in the same recording method, the test pattern signal is fully erased by the overwriting process.

Figure 28:
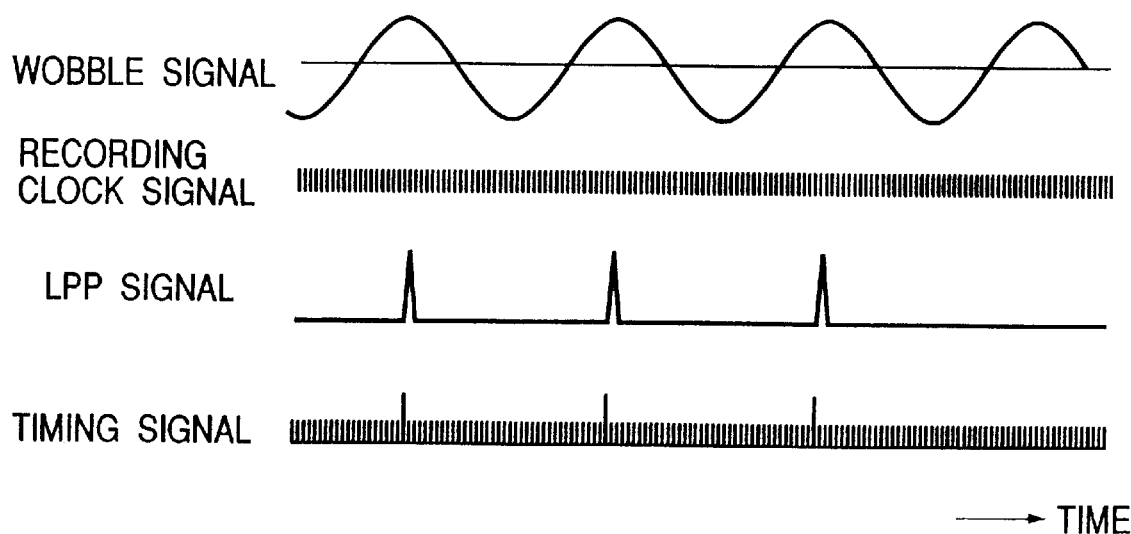
FIG. 28 is a time-domain diagram of a wobble signal, a recording clock signal, an LPP signal, and a timing signal.

With reference back to FIG. 11, the PLL circuit 71 receives the wobble signal from the wobble detection circuit 72. The wobble signal has a frequency of, for example, 140 kHz. The wobble signal has a waveform shown in FIG. 28. The PLL circuit 71 multiplies the frequency of the wobble signal, thereby generating the recording clock signal having a frequency equal to an integer multiple of the wobble signal frequency (see FIG. 28). The frequency of the recording clock signal is equal to, for example, 27 MHz. The timing signal generation circuit 74 receives the recording clock signal from the PLL circuit 71. Also, the timing signal generation circuit 74 receives the recording/reproduction timing signal (the LPP signal) from the address detection circuit 73. The LPP signal has a waveform shown in FIG. 28. A 1-sync-frame corresponding signal is recorded on the optical disc 22 in synchronism with the LPP signal. The timing signal generation circuit 74 counts pulses in the recording clock signal while using a timing given by the LPP signal as a reference. Thereby, the timing signal generation circuit 74 produces timing pulses T0, T1, T2, T3, . . . corresponding to the front ends of the sectors in the test ECC block respectively (see FIG. 12). The timing signal generation circuit 74 outputs the timing pulses T0, T1, T2, T3, . . . to the asymmetry detection circuit 70 as a reproduction timing signal. The timing signal outputted from the timing signal generation circuit 74 has a waveform shown in FIG. 28.

Figure 16:
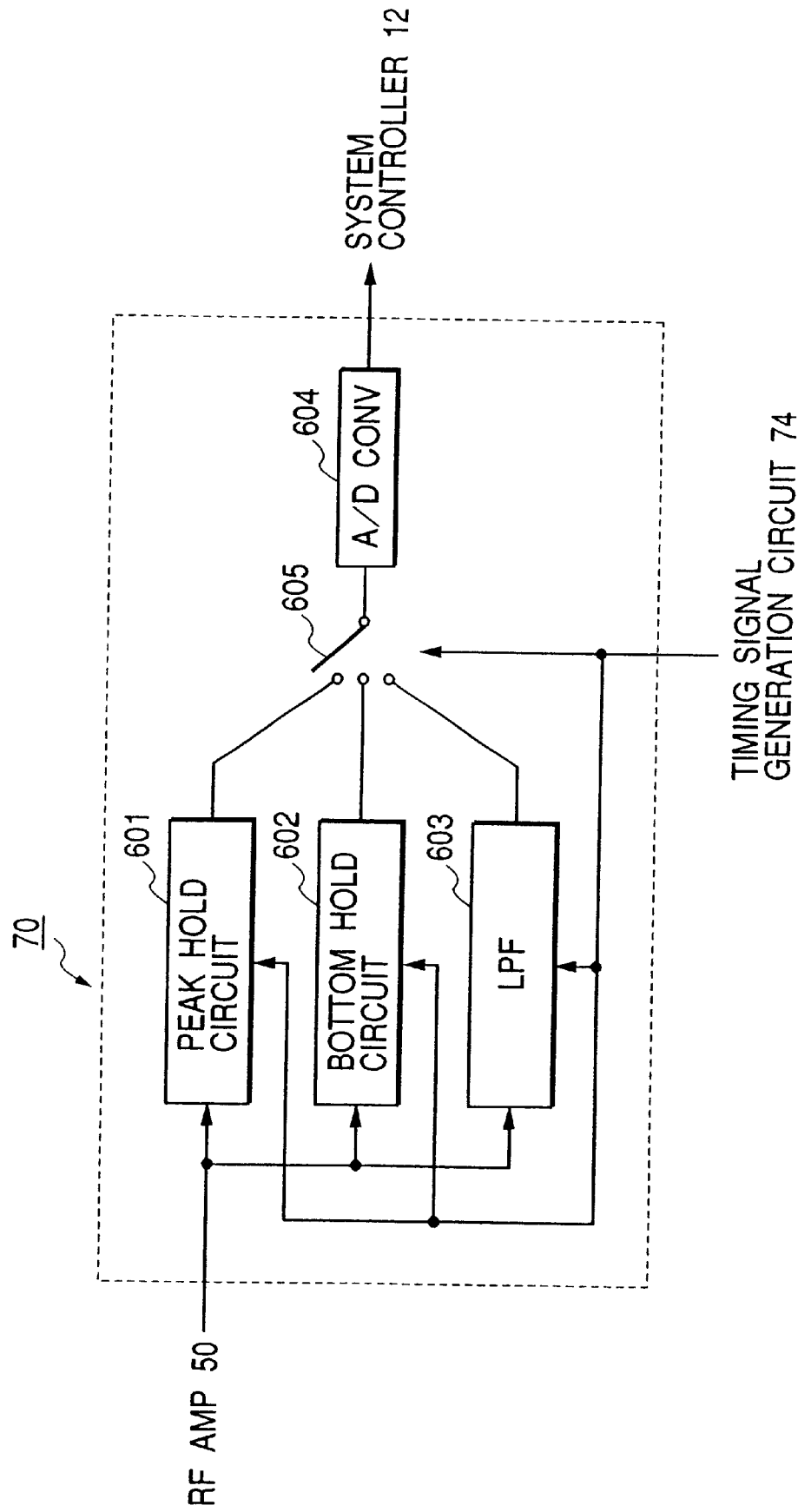
FIG. 16 is a block diagram of an asymmetry detection circuit in FIG. 11.

As shown in FIG. 16, the asymmetry detection circuit 70 includes a peak hold circuit 601, a bottom hold circuit 602, a low pass filter (an LPF) 603, an A/D converter 604, and a switch 605. The peak hold circuit 601, the bottom hold circuit 602, and the. LPF 603 receive the output signal of the RF amplifier 50. The peak hold circuit 601, the bottom hold circuit 602, the LPF 603, and the switch 605 receive the reproduction timing signal (the timing pulses) from the timing signal generation circuit 74.

The peak hold circuit 601 and the bottom hold circuit 602 are reset at the moment given by the timing pulse T0 (see FIG. 12). The peak hold circuit 601 holds the peak level of the lowest-frequency signal "11 T" which is reproduced from the first sector, that is, the B0 sector in the test ECC block during the time interval between the moments given the timing pulses T0 and T1 (see FIG. 12). The peak hold circuit 601 outputs a signal representative of the held peak level to the switch 605. The bottom hold circuit 602 holds the bottom level of the lowest-frequency signal "11 T" which is reproduced from the first sector in the test ECC block. The bottom hold circuit 602 outputs a signal representative of the held bottom level to the switch 605. The LPF 603 smooths or averages the highest-frequency signal "3 T" which is reproduced from the second sector, that is, the B1 sector in the test ECC block during the time interval between the moments given by the timing pulses T1 and T2 (see FIG. 12). Thus, the LPF 603 generates a signal representing the center level of the highest-frequency signal "3 T" reproduced from the second sector in the test ECC block. The LPF 603 outputs the center level signal to the switch 605. During a short time interval at and around the moment given by the timing pulse T2, the switch 605 sequentially selects and transmits the peak level signal, the bottom level signal, and the center level signal to the A/D converter 604. The A/D converter 604 changes the peak level signal, the bottom level signal, and the center level signal into corresponding digital data. The A/D converter 604 outputs the digital data to the system controller 12. In this way, the peak level, the bottom level, and the center level are detected and are notified to the system controller 12 for first one of the eight different-power-status sets of the lowest-frequency signal "11 T" and the highest-frequency signal "3 T". Similarly, the peak level, the bottom level, and the center level are detected and are notified to the system controller 12 for second and later ones of the eight different-power-status sets of the lowest-frequency signal "11 T" and the highest-frequency signal "3 T".

According to the first embodiment of this invention, during a free time of the optical head 24 in the term of writing contents data into the memory 28, the test pattern signal is recorded on and reproduced from a disc position to be accessed next for the recording of the contents data. The asymmetry of the reproduced test pattern signal is measured. The waveform correction parameters which determine the intensity (the power) of the laser beam are set and adjusted so as to optimize the measured asymmetry. Thus, the optimal conditions of the signal recording on the disc position to be accessed next are detected on a measurement basis. In some cases, the recording sensitivity of the optical disc 22 varies from disc position to disc position. Therefore, in these cases, the optical recording conditions vary from disc position to disc position. In the first embodiment of this invention, it is possible to detect the optimal recording conditions at each of varying disc positions. As previously mentioned, the test pattern signal is erased since the new contents data are written thereover. Therefore, it is unnecessary to provide an exclusive disc area for storing the test pattern signal. Furthermore, it is unnecessary for the optical head 24 to implement seek to the exclusive disc area for storing the test pattern signal. In addition, it is unnecessary to provide a special time of setting and adjusting the waveform correction parameters.

Second Embodiment

A second embodiment of this invention is a modification of the first embodiment thereof. The second embodiment of this invention uses a block SGA instead of the step SG in FIG. 14.

Figure 17:
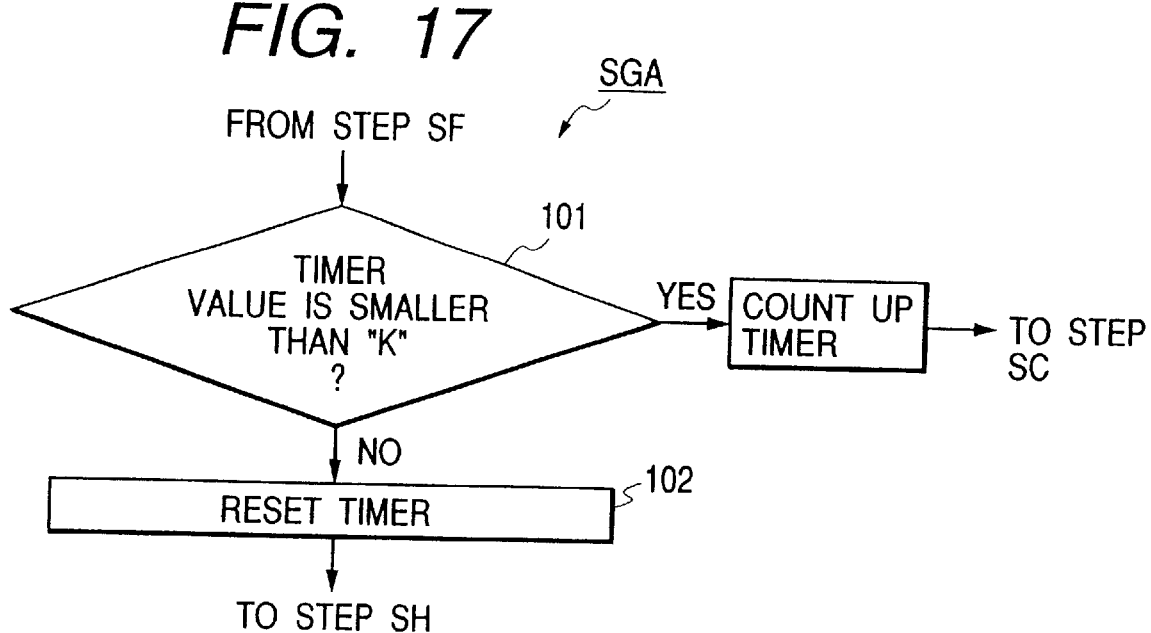
FIG. 17 is a flowchart of a block in a program segment in a second embodiment of this invention.

As shown in FIG. 17, the block SGA has a first step 101 following the step SF (see FIG. 14). The step 101 decides whether or not a timer value is smaller than a predetermined value "k". When the timer value is not smaller than the predetermined value "k", that is, when the timer value is equal to or greater than the predetermined value "k", the program advances from the step 101 to a step 102. When the timer value is smaller than the predetermined value "k", the program advances from the step 101 to a step 103.

The step 102 resets the timer value. After the step 102, the program advances to the step SH (see FIG. 14).

The step 103 counts up or increments the timer value by "1". After the step 103, the program returns to the step SC (see FIG. 14).

Third Embodiment

A third embodiment of this invention is a modification of the first embodiment thereof. The third embodiment of this invention uses a block SGB instead of the step SG in FIG. 14.

Figure 18:
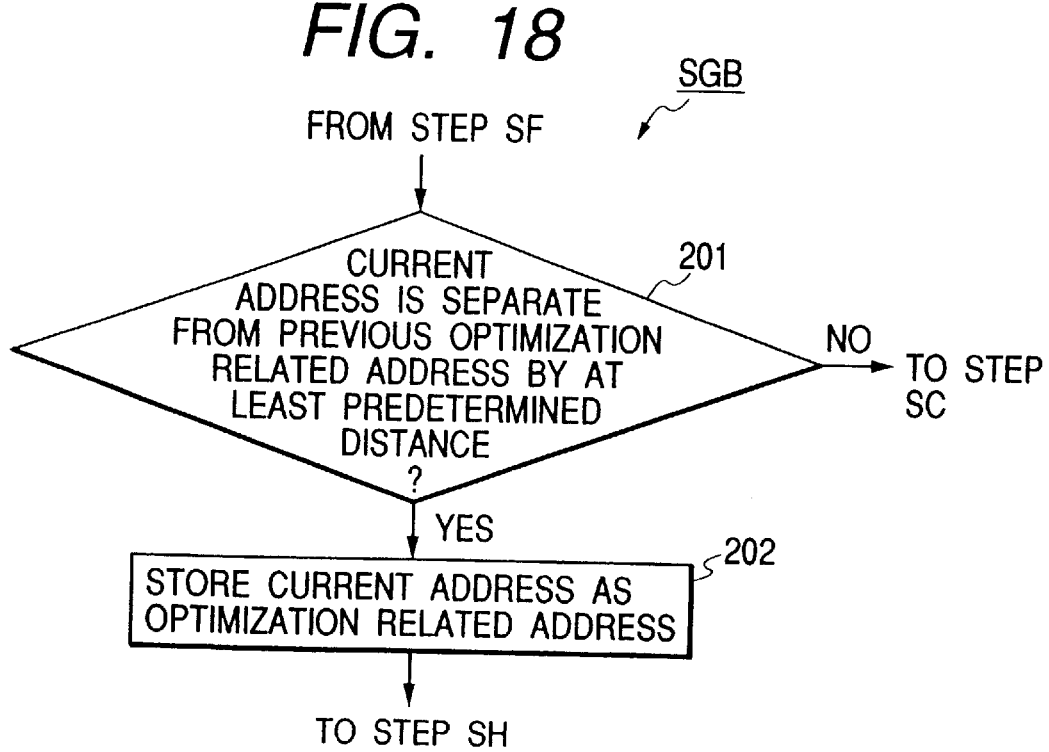
FIG. 18 is a flowchart of a block in a program segment in a third embodiment of this invention.

As shown in FIG. 18, the block SGB has a first step 201 following the step SF (see FIG. 14). The step 201 decides whether or not the address of a new ECC block for data recording is separate from the address of a last test ECC block by at least a predetermined distance (a predetermined address value). When the address of the new ECC block is separate from the address of the last test ECC block by at least the predetermined distance, the program advances from the step 201 to a step 202. Otherwise, the program returns from the step 201 to the step SC (see FIG. 14).

The step 202 stores the address of the new ECC block as the address of a newest ECC block. After the step 202, the program advances to the step SH (see FIG. 14).

Fourth Embodiment

A fourth embodiment of this invention is a modification of the first embodiment thereof. The fourth embodiment of this invention uses a block SGC instead of the step SG in FIG. 14.

Figure 19:
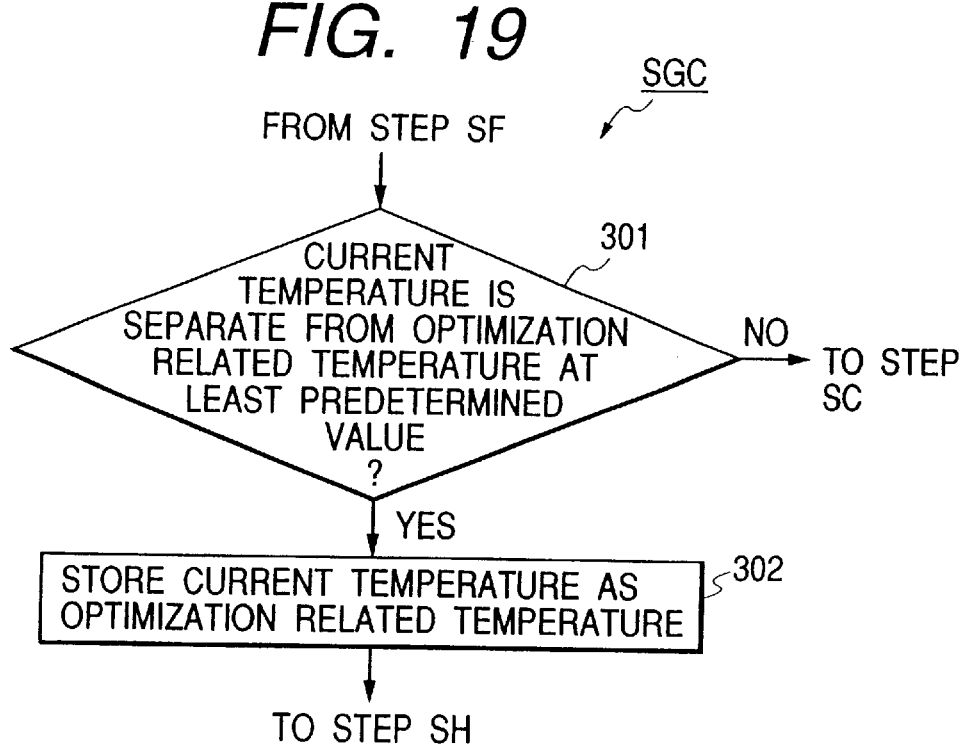
FIG. 19 is a flowchart of a block in a program segment in a fourth embodiment of this invention.

As shown in FIG. 19, the block SGC has a first step 301 following the step SF (see FIG. 14). The step 301 decides whether or not the present temperature is separate from the temperature, which occurs at the last execution of the waveform correction optimizing process, by at least a predetermined value. When the present temperature is separate from the temperature, which occurs at the last execution of the waveform correction optimizing process, by at least the predetermined value, the program advances from the step 301 to a step 302. Otherwise, the program returns from the step 301 to the step SC (see FIG. 14).

The step 302 stores information of the present temperature as the temperature which occurs at the new execution of the waveform correction optimizing process. After the step 302, the program advances to the step SH (see FIG. 14).

Fifth Embodiment

A fifth embodiment of this invention is a modification of the first embodiment thereof. The fifth embodiment of this invention uses a block SGD instead of the step SG in FIG. 14.

Figure 20:
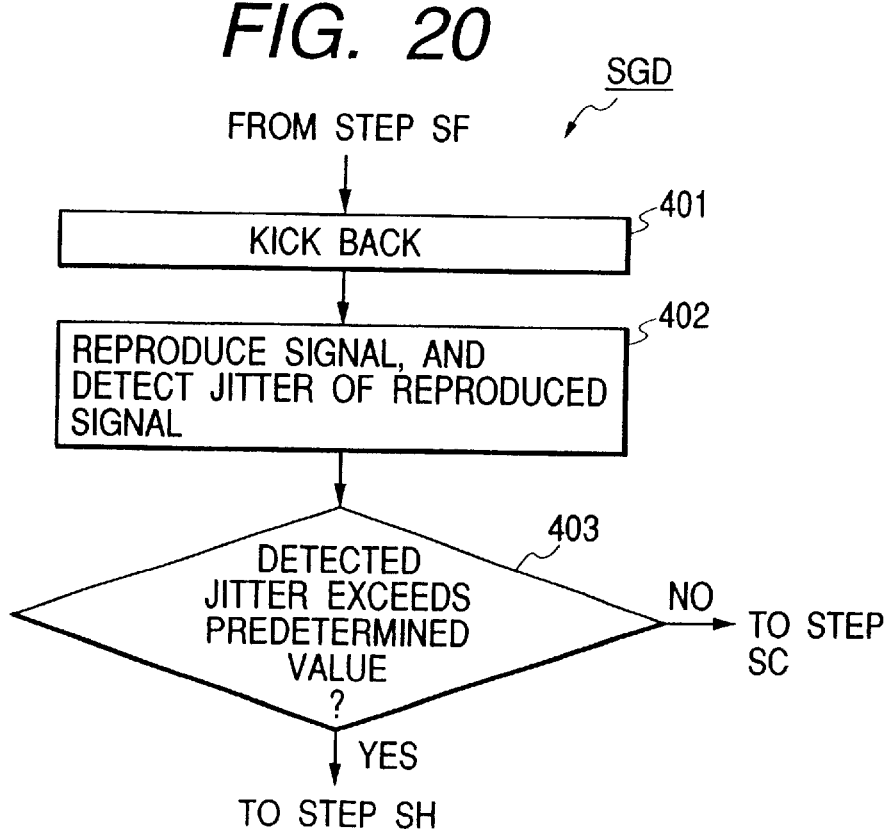
FIG. 20 is a flowchart of a block in a program segment in a fifth embodiment of this invention.

As shown in FIG. 20, the block SGD has a first step 401 following the step SF (see FIG. 14). The step 401 kicks the optical head 24 back to the front end of the last accessed ECC block.

A step 402 following the step 401 reproduces a signal from the ECC block. The step 402 detects jitter of the reproduced signal.

A step 403 subsequent to the step 402 decides whether or not the detected jitter exceeds a predetermined value. When the detected jitter exceeds the predetermined value, the program advances from the step 403 to the step SH (see FIG. 14). Otherwise, the program returns from the step 403 to the step SC (see FIG. 14).

Sixth Embodiment

A sixth embodiment of this invention is a modification of the first embodiment thereof. The sixth embodiment of this invention uses a block SGE instead of the step SG in FIG. 14.

Figure 21:
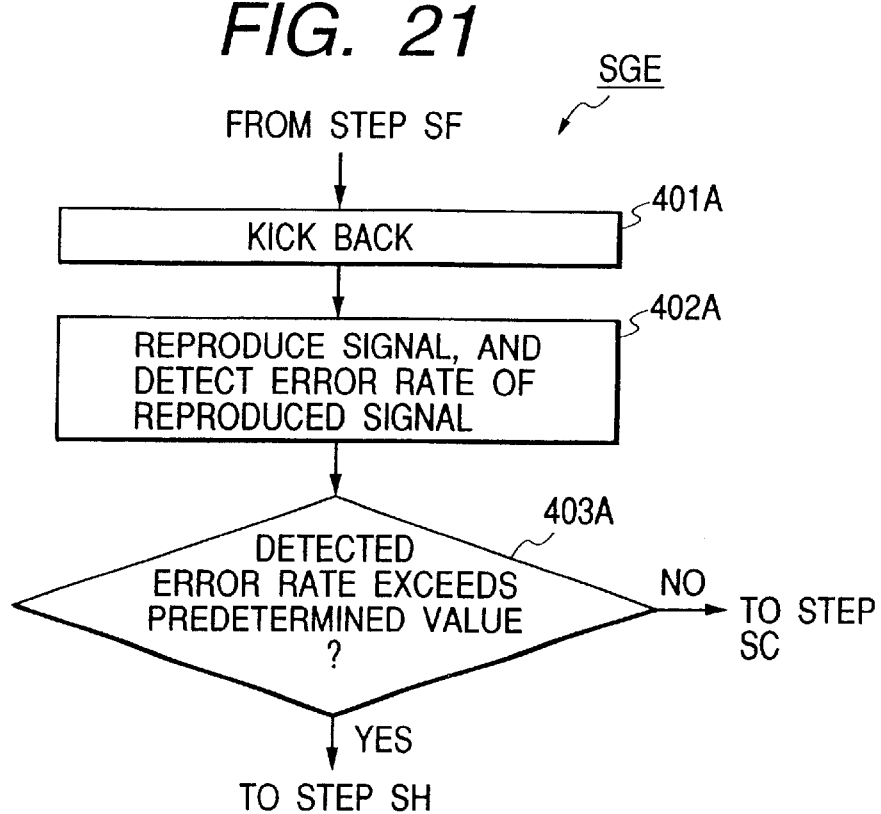
FIG. 21 is a flowchart of a block in a program segment in a sixth embodiment of this invention.

As shown in FIG. 21, the block SGE has a first step 401A following the step SF (see FIG. 14). The step 401A kicks the optical head 24 back to the front end of the last accessed ECC block.

A step 402A following the step 401A reproduces data from the ECC block. The step 402A detects the error rate of the reproduced data.

A step 403A subsequent to the step 402A decides whether or not the detected error rate exceeds a predetermined value. When the detected error rate exceeds the predetermined value, the program advances from the step 403A to the step SH (see FIG. 14). Otherwise, the program returns from the step 403A to the step SC (see FIG. 14).

Seventh Embodiment

A seventh embodiment of this invention is a modification of the first embodiment thereof. The seventh embodiment of this invention uses a block SGF instead of the step SG in FIG. 14.

Figure 22:
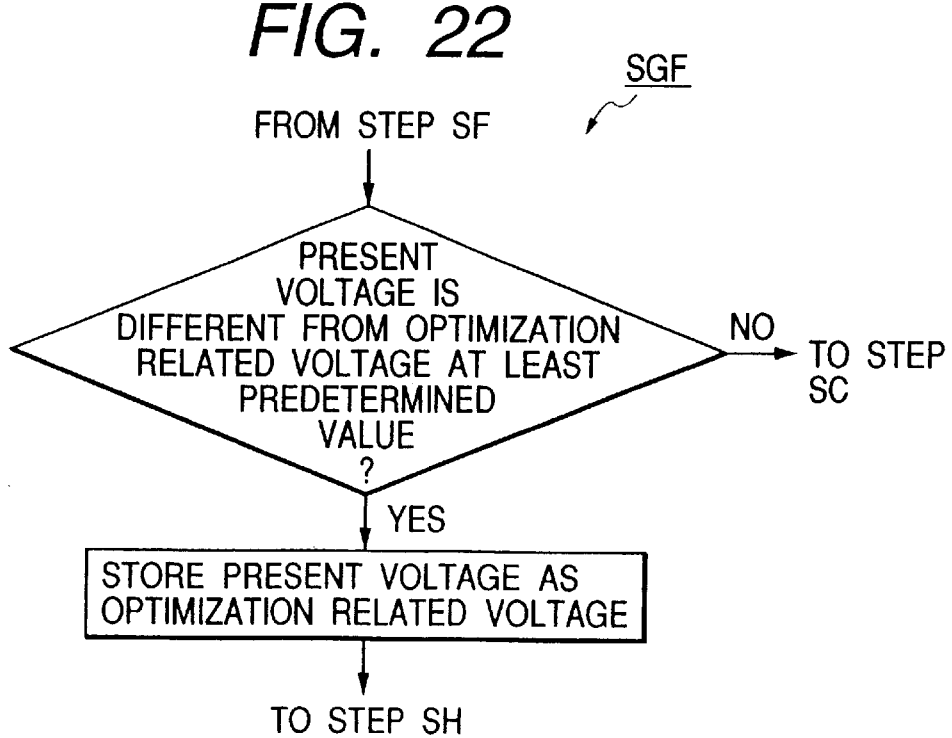
FIG. 22 is a flowchart of a block in a program segment in a seventh embodiment of this invention.

As shown in FIG. 22, the block SGF has a first step 501 following the step SF (see FIG. 14). The step 501 decides whether or not the present voltage of the feedback signal from the monitor diode is different from the feedback signal voltage, which occurs at the last execution of the waveform correction optimizing process, by at least a predetermined value. When the present voltage of the feedback signal is different from the feedback signal voltage, which occurs at the last execution of the waveform correction optimizing process, by at least the predetermined value, the program advances from the step 501 to a step 502. Otherwise, the program returns from the step 501 to the step SC (see FIG. 14).

The step 502 stores information of the present voltage of the feedback signal as the feedback signal voltage which occurs at the new execution of the waveform correction optimizing process. After the step 502, the program advances to the step SH (see FIG. 14).

Eighth Embodiment

An eighth embodiment of this invention is a combination of the second and third embodiments thereof. In the eighth embodiment of this invention, the waveform correction optimizing process is executed when the step 101 decides that the timer value is equal to or greater than the predetermined value "k" or when the step 201 decides that the address of the new ECC block is separate from the address of the last test ECC block by at least the predetermined distance.

Ninth Embodiment

A ninth embodiment of this invention is a combination of the second, third, fourth, fifth, sixth, and seventh embodiments thereof. In the ninth embodiment of this invention, the waveform correction optimizing process is executed only when at least one of the following conditions 1), 2), 3), 4), 5), and 6) is satisfied.
1) The step 101 decides that the timer value is equal to or greater than the predetermined value "k".
2) The step 201 decides that the address of the new ECC block is separate from the address of the last test ECC block by at least the predetermined distance.
3) The step 301 decides that the present temperature is separate from the temperature, which occurs at the last execution of the waveform correction optimizing process, by at least the predetermined value.
4) The step 403 decides that the detected jitter exceeds the predetermined value.
5) The step 403A decides that the detected error rate exceeds the predetermined value.
6) The step 501 decides that the present voltage of the feedback signal is different from the feedback signal voltage, which occurs at the last execution of the waveform correction optimizing process, by at least the predetermined value.

Tenth Embodiment

A tenth embodiment of this invention is a combination of the second and third embodiments thereof. In the tenth embodiment of this invention, the waveform correction optimizing process is executed only when both the following conditions 1) and 2) are satisfied.
1) The step 101 decides that the timer value is equal to or greater than the predetermined value "k".
2) The step 201 decides that the address of the new ECC block is separate from the address of the last test ECC block by at least the predetermined distance.

Eleventh Embodiment

An eleventh embodiment of this invention is a combination of the second, third, and fourth embodiments thereof. In the eleventh embodiment of this invention, the waveform correction optimizing process is executed only when at least one of the following conditions 1) and 2) are satisfied.
1) The step 101 decides that the timer value is equal to or greater than the predetermined value "k". The step 201 decides that the address of the new ECC block is separate from the address of the last test ECC block by at least the predetermined distance.
2) The step 101 decides that the timer value is equal to or greater than the predetermined value "k". The step 301 decides that the present temperature is separate from the temperature, which occurs at the last execution of the waveform correction optimizing process, by at least the predetermined value.

Twelfth Embodiment

A twelfth embodiment of this invention is a combination of at least two of the second, third, fourth, fifth, sixth, and seventh embodiments thereof.

Thirteenth Embodiment

A thirteenth embodiment of this invention is a modification of one of the first to twelfth embodiments thereof. In the thirteenth embodiment of this invention, the peak level of the lowest-frequency signal "11 T" reproduced from one sector in the test ECC block is sampled and held at each of different time points. The sampled and held peak levels are averaged into a mean peak level. The mean peak level is notified to the system controller. Similarly, the bottom level of the lowest-frequency signal "11 T" reproduced from one sector in the test ECC block is sampled and held at each of different time points. The sampled and held bottom levels are averaged into a mean bottom level. The mean bottom level is notified to the system controller.

The thirteenth embodiment of this invention compensates for a variation in the conditions of the 1-sector-corresponding reproduced signal which might be caused by noise in the apparatus, unevenness in the sensitivity of the optical disc 22, and a change in the tracking servo conditions. Therefore, the thirteenth embodiment of this invention accurately measures or detects the asymmetry.

Fourteenth Embodiment

A fourteenth embodiment of this invention is a modification of one of the first to thirteenth embodiments thereof. The fourteenth embodiment of this invention measures the jitter instead of the asymmetry. The test pattern signal may be a random signal or a portion of the contents data.

In the fourteenth embodiment of this invention, the test pattern signal is recorded on a test ECC block while the power conditions or the intensity conditions of the laser beam (at least one of the waveform correction parameters in the waveform correction circuit 60) are changed 2-sector by 2-sector. The test pattern signal is reproduced from the test ECC block. The jitter of the reproduced signal is measured at a timing similar to the previously-indicated timing for each of the sector pairs. The smallest of the measured jitters is selected. From among the eight different power conditions (statuses), one is selected which corresponds to the smallest jitter. The selected one of the eight different power statuses is used as an optimal power status. The waveform correction parameter or parameters in the waveform correction circuit 60 are changed in accordance with the optimal power status. The change of the waveform correction parameter or parameters may be implemented by using a predetermined correction coefficient or coefficients in a table corresponding to the characteristics of the optical disc 22.

Fifteenth Embodiment

A fifteenth embodiment of this invention is a modification of one of the first to fourteenth embodiments thereof. In the fifteenth embodiment of this invention, during the test mode of operation of the apparatus, a laser beam whose power changes between at least two different levels (for example, a recording level and an erasing level) is applied to a given-address position on the optical disc 22.

In the case where the optical disc 22 is of the phase change rewritable type, the power of the laser beam may change among a reproducing level, an erasing level, and a recording level. In the case where the optical disc 22 is of the organic-dye recordable type, the power of the laser beam may change between a reproducing level and a recording level.

The feedback signal outputted from the monitor diode indicates the measured power (the measured intensity) of the laser beam. The feedback signal is converted into corresponding digital data. The system controller 12 derives, from the digital data, the measured values corresponding to the different power levels respectively. The system controller 12 calculates the errors between the measured values and optimal values. The system controller 12 controls the actual power levels of the laser beam so as to move the measured values toward the optical values.

The fifteenth embodiment of this invention compensates for a variation in the laser power (the laser intensity) which might be caused by the temperature dependency and the ageing of the semiconductor laser.

The control in the fifteenth embodiment of this invention may be combined with the previously-mentioned control based on the asymmetry measurement or the jitter measurement.

The fifteenth embodiment of this invention uses a block SIZ instead of the block SI in FIGS. 14 and 15.

Figure 23:
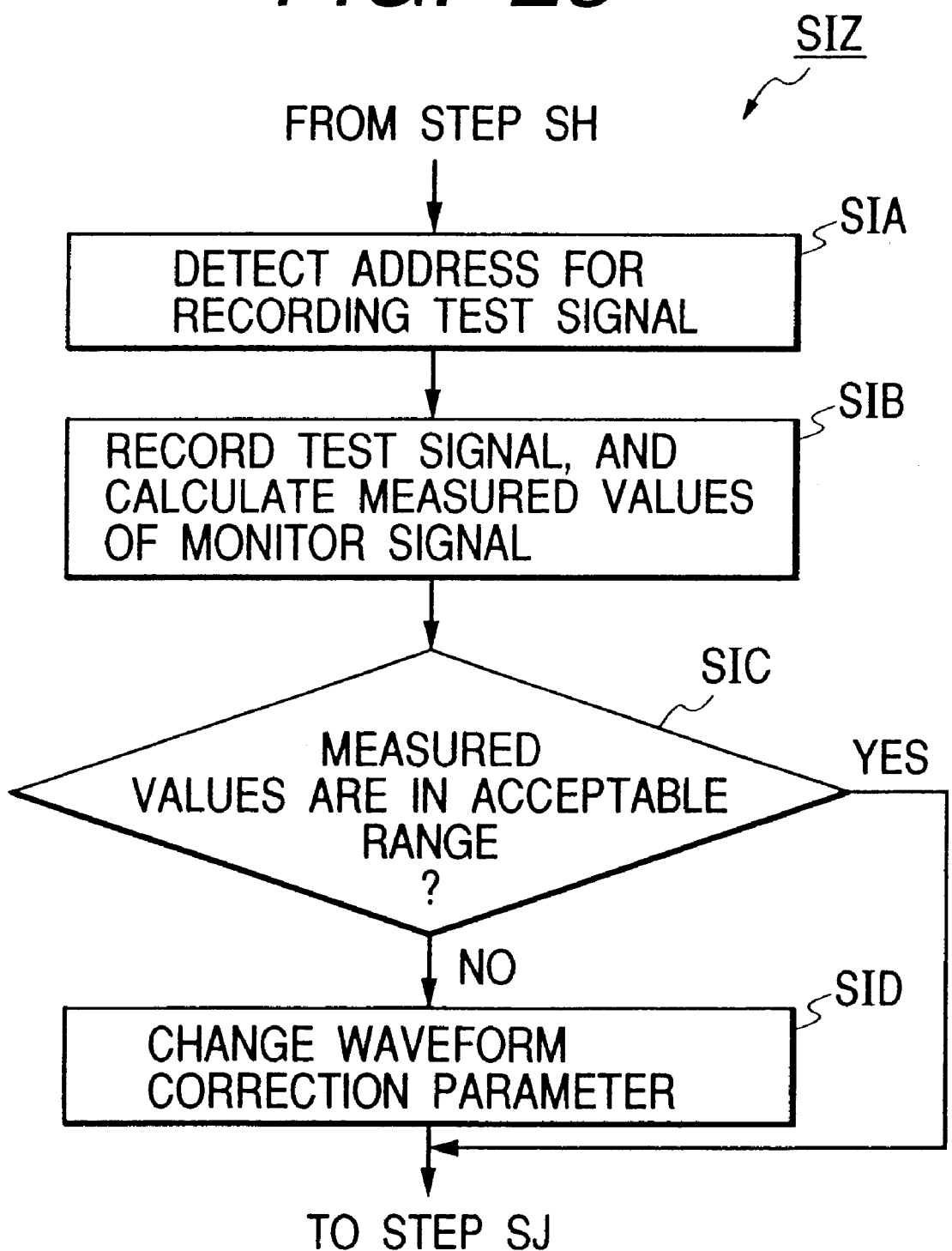
FIG. 23 is a flowchart of a block in a program segment in a fifteenth embodiment of this invention.

As shown in FIG. 23, the block SIZ has a first step SIA following the step SH (see FIG. 14). The step SIA detects the address of a position (an ECC block) on the optical disc 22 which immediately follows the address of the last accessed position loaded with the contents data. The ECC block address A2 in FIG. 12 corresponds to the address detected by the step SIA while the ECC block address A1 in FIG. 12 corresponds to the address of the last accessed position loaded with the contents data.

A step SIB subsequent to the step SIA controls the amplifier unit 26 to record the test pattern signal on the disc position (the ECC block) whose address is detected by the step SIA. During the recording of the test pattern signal, the step SIB changes the power or the intensity of the laser beam between at least two different levels. The step SIB derives, from the feedback signal outputted by the monitor diode, the measured values corresponding to the different power levels respectively. The step SIB calculates the errors between the measured values and optimal values.

A step SIC following the step SIB decides whether or not a set of the calculated errors is in a predetermined acceptable range. When the set of the calculated errors is in the acceptable range, the program advances from the step SIC to the step SJ (see FIG. 14). When the set of the calculated errors is not in the acceptable range, the program advances from the step SIC to a step SID.

The step SID outputs a control signal to the waveform correction circuit, thereby changing the waveform correction parameter or parameters in the direction of moving the measured power values toward the optimal power values. After the step SID, the program advances to the step SJ (see FIG. 14).

Sixteenth Embodiment

A sixteenth embodiment of this invention is a modification of one of the first to fifteenth embodiments thereof. According to the sixteenth embodiment of this invention, during every free time of the optical head 24 in the recording mode of operation of the apparatus, the waveform correction optimizing process is implemented.

Seventeenth Embodiment

A seventeenth embodiment of this invention is a modification of one of the first to sixteenth embodiments thereof. The seventeenth embodiment of this invention executes the waveform correction optimizing process without deciding whether or not the waveform correction optimizing process should be executed.

Eighteenth Embodiment

An eighteenth embodiment of this invention is a modification of one of the first to seventeenth embodiments thereof. The eighteenth embodiment of this invention changes the waveform correction parameters for determining the time intervals Ta, Th, Tc, and Td in accordance with the temperature measured by the temperature sensor 36. For example, when the measured temperature is 10° C., the waveform correction parameters are changed so that the time interval Td will be increased relative to the time interval Tc. When the measured temperature is 40° C, the waveform correction parameters are changed so that the time interval Tc will be increased relative to the time interval Td.

Nineteenth Embodiment

A nineteenth embodiment of this invention is a modification of one of the first to eighteenth embodiments thereof. According to the nineteenth embodiment of this invention, during the test mode of operation of the apparatus, the highest-frequency signal "3 T" is extracted from the reproduced RF signal. The waveform correction parameters in the waveform correction circuit 60 are controlled so as to maximize the amplitude of the highest-frequency signal "3 T".

Twentieth Embodiment

A twentieth embodiment of this invention is a modification of one of the first to-nineteenth embodiments thereof. In the twentieth embodiment of this invention, the waveform correction optimizing process uses the jitter instead of the asymmetry. The twentieth embodiment of this invention includes a suitable circuit for counting the number of times of recording in connection with the recording track. The number of times of recording is incremented by "1" each time recording is executed. The eight different statuses P1, P2, . . . , and P8, among which the power conditions of the laser beam are changed, are varied in the direction of increasing the acceptable limit jitter value as the number of times of recording increases. It is preferable to change the time intervals Ta, Th, Tc, and Td on a stepwise basis. The twentieth embodiment of this invention compensates for an adverse change in jitter due to an increase in the number of times of recording.

Twenty-First Embodiment

A twenty-first embodiment of this invention is a modification of one of the first to twentieth embodiments thereof. In the twenty-first embodiment of this invention, every signal pulse is shaped into a train of short pulses based on the recording waveform WA independent of the disc-scanning linear velocity. The amplitude of the pulse train (for example, the amplitude of a front end portion of the pulse train) is changed in accordance with the disc-scanning linear velocity. The twenty-first embodiment of this invention can provide a relatively great phase margin.

Twenty-Second Embodiment

A twenty-second embodiment of this invention is a modification of one of the first to twenty-first embodiments thereof. In the twenty-second embodiment of this invention, every signal pulse is shaped into a train of short pulses based on the recording waveform WA independent of the disc-scanning linear velocity. The width of the short pulses in the train is changed in accordance with the disc-scanning linear velocity.

Figure 24:
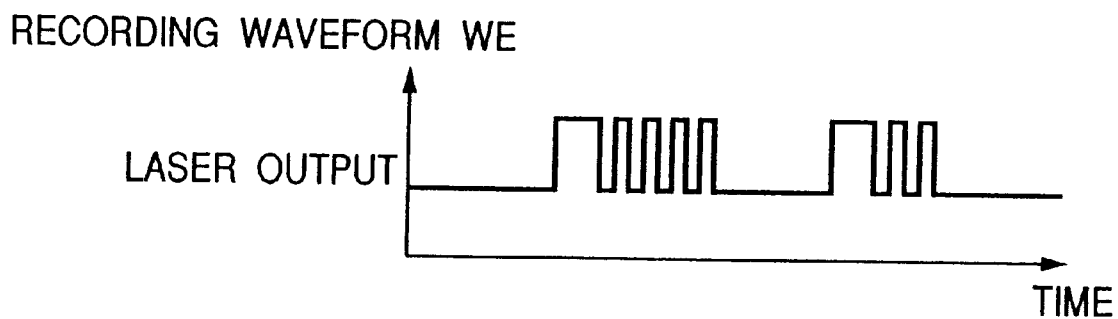
FIG. 24 is a diagram of a recording waveform of a laser beam.
Figure 25:
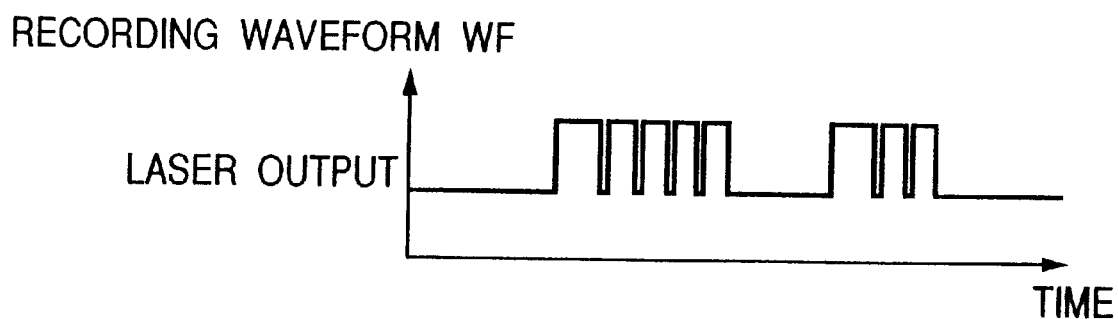
FIG. 25 is a diagram of a recording waveform of a laser beam.

The twenty-second embodiment of this invention changes the laser beam between a recording waveform WE of FIG. 24 and a recording waveform WF of FIG. 25 in accordance with the disc-scanning linear velocity. As shown in FIG. 24, the recording waveform WE has a train of a first pulse and later pulses with a relatively small width. As shown in FIG. 25, the recording waveform WF has a train of a first pulse and later pulses with a relatively large width. The recording waveform WE is used for a low linear velocity while the recording waveform WF is used for a high linear velocity. Since the heat accumulation effect is weaker as the disc-scanning linear velocity rises, the large-width pulses in the recording waveform WF are prevented from causing an unwanted distortion in the shape of a recording mark.

The recording waveforms WE and WF may be modified as the recording waveform WC of FIG. 7 is designed. Specifically, in the modifications of the recording waveforms WE and WF, during a limited time interval immediately preceding each pulse train and a limited time interval immediately following the pulse train, the power of the laser beam is lower than the erasing level Pb.

The recording waveforms WE and WF may be modified as the recording waveform WD of FIG. 8 is designed. Specifically, according to the modifications of the recording waveforms WE and WF, in each pulse train, the power of a laser beam changes between a recording level Pp and a reproducing level (or a null level).

Twenty-Third Embodiment

A twenty-third embodiment of this invention is a modification of one of the first to twenty-second embodiments thereof. The twenty-third embodiment of this invention is designed to properly operate on a partial ROM disc, a hybrid optical disc having an inner portion forming a ROM area and an outer portion forming a phase change RAM area, a two-layer optical disc having one phase change recording film, a two-layer optical disc having two phase change recording films, a two-layer optical disc having one read only layer, or an optical disc having two or more layers.

The twenty-third embodiment of this invention includes a device for detecting a multi-layer optical disc, a device for detecting that at least one layer of a multi-layer optical disc is a recordable layer (or a rewritable layer), and a focus jump device for focusing the laser beam on the signal surface of selected one of layers in a multi-layer optical disc. In the twenty-third embodiment of this invention, the waveform correction values for the layers are decided during the test mode of operation of the apparatus, and the signals of the decided waveform correction values are stored.

Twenty-Fourth Embodiment

A twenty-fourth embodiment of this invention is a modification of one of the first to twenty-third embodiments thereof. The twenty-fourth embodiment of this invention provides an optical disc drive apparatus which does not have any signal compressing/expanding circuit. Examples of the optical disc drive apparatus are computer peripheral apparatuses such as a DVD-RAM drive apparatus and a DVD-RW drive apparatus.

Compressed data are outputted from the optical disc drive apparatus to an external computer without being expanded. Then, the compressed data are expanded in the external computer according to software. The optical disc drive apparatus and the external computer are connected by a bus of, for example, an ATAPI type or a IEEE1394 type.

In the optical disc drive apparatus, a suitable device monitors the state of the optical head 24, and decides which of a recording state, a reproducing state, a seek state, a busy state, and an unselected state the optical head 24 assumes. When the optical head 24 falls into the unselected state, the waveform correction optimizing process is executed.

When the drive of the optical disc 22 has been started, the type of the optical disc 22 is decided on the basis of the conditions of disc insertion and the conditions of turning on the power supply. Specifically, a decision is made as to whether the optical disc 22 has a single layer or multiple layers. In addition, a decision is made as to whether or not the optical disc 22 has a recordable layer (a rewritable layer). In the case where the optical disc 22 has a recordable layer (a rewritable layer), a decision is made as to whether or the waveform correction optimizing process should be executed.

For example, a flag is used as an indication of whether or the waveform correction optimizing process should be executed. The flag in a logic state of "0" indicates that the waveform correction optimizing process should be executed. The flag in a logic state of "1" indicates that the waveform correction optimizing process should not be executed. When the power supply is turned on or the optical disc 22 is inserted into the apparatus, the flag is in a logic state of "0". Thus, at this time, by referring to the flag, it is decided that the waveform correction optimizing process should be executed. Therefore, the waveform correction optimizing process is actually executed. Then, the flag is changed to a logic state of "1".

When a predetermined time has elapsed since the moment of the last execution of the waveform correction optimizing process, the flag is returned to a logic state of "0". When the present temperature differs from that occurring at the moment of the last execution of the waveform correction optimizing process by more than a predetermined value, the flag is returned to a logic state of "0".

In the case where the optical disc 22 has a recordable layer (a rewritable layer), detection is given of whether or not the optical head 24 falls into the unselected state. When the flag is in a logic state of "0" and the optical head 24 falls into the unselected state, the waveform correction optimizing process is executed.

The optical disc drive apparatus includes a focus jump device for focusing the laser beam on the signal surface of selected one of layers in the optical disc 22. In the optical disc drive apparatus, the waveform correction values for the layers are decided during the test mode of operation of the apparatus, and the signals of the decided waveform correction values are stored.

Twenty-fifth Embodiment

A twenty-fifth embodiment of this invention is a modification of one of the first to twenty-fourth embodiments thereof. In the twenty-fifth embodiment of this invention, the optical disc 22 is of the DVD type. An innermost portion of the optical disc has a lead-in area. The outer edge of the innermost portion of the optical disc has a radius of 24 mm. A major portion of the optical disc 22 which extends radially outward of the innermost portion is used as a data area.

The lead-in area of the optical disc 22 stores physical information representing the disc type, the layer condition, the reflectivity, the data start address, and the data end address. The disc type means the read only type, the write once type, or the rewritable type. The layer condition means the single-layer disc, the two-layer disc, "parallel", or "opposite". The reflectivity is equal to 0.7 in the case of the single-layer disc. The reflectivity is equal to 0.3 in the case of the two-layer disc.

In addition, the lead-in area of the optical disc 22 stores the following information pieces 1̂–6̂. The information piece 1̂ indicates the optimal recording power level Pp and the optimal erasing power level Pb of the laser beam (see FIG. 3). The information piece 2̂ indicates the optimal time intervals Ta, Tb, Tc, and Td (see FIG. 3). The information piece $\hat{2}$ may indicate the optimal values of the waveform correction parameters in the waveform correction circuit 60 which determine the time intervals Ta, Tb, Tc, and Td. The information piece $\hat{3}$ indicates the disc-scanning linear velocity and the temperature at which the waveform correction optimizing process was executed. The information piece $\hat{4}$ indicates the identification code word (ID) of the recording apparatus. The information piece $\hat{5}$ indicates the disc maker. The information piece $\hat{5}$ may further indicate the maker of the recording apparatus. The information piece $\hat{6}$ indicates the production lot number of the disc. The information piece $\hat{6}$ may further indicate the disc maker and the recording apparatus maker.

The lead-in area of the optical disc 22 may store an encrypted version of the information pieces $\hat{1}$–$\hat{6}$. In the case where the optical disc 22 has two or more layers, only one of the layers may store the information pieces $\hat{1}$–$\hat{6}$.

The lead-in area of the optical disc 22 includes a test recording area on which the test pattern signal is recorded during the waveform correction optimizing process. The test recording area may be located outside the lead-in area.

When the optical disc 22 is placed in the apparatus and the drive of the optical disc 22 is started, a signal is reproduced from the lead-in area thereof. The information pieces $\hat{1}$–$\hat{6}$ are extracted from the reproduced signal. During later recording, the apparatus uses the optimal waveform correction values indicated by the information pieces $\hat{1}$ and $\hat{2}$. The optimal waveform correction values mean the optimal recording power level Pp and the optimal erasing power level Pb of the laser beam, and the optimal time intervals Ta, Tb, Tc, and Td. The optimal waveform correction values may mean the optimal values of the waveform correction parameters in the waveform correction circuit 60 which determine the time intervals Ta, Tb, Tc, and Td. The way of use of the optimal waveform correction values is changed in response to the disc maker, the reproduction lot number of the disc, and the recording apparatus maker indicated by the information pieces $\hat{5}$ and $\hat{6}$. On the other hand, in the absence of the information pieces $\hat{1}$ and $\hat{2}$ from the reproduced signal, the waveform correction optimizing process is executed to determine the optimal waveform correction values (the optimal values of the waveform correction parameters). Signals of the optimal waveform correction values are encoded into the information pieces $\hat{1}$ and $\hat{2}$. Then, the information pieces $\hat{1}$ and $\hat{2}$ are recorded on the lead-in area of the optical disc 22.

During the execution of the waveform correction optimizing process, the temperature is measured via the temperature sensor 36. A signal of the measured temperature and a signal of the disc-8 scanning linear velocity are encoded into the information piece $\hat{3}$. The information piece $\hat{3}$ is recorded on the lead-in area of the optical disc 22 while the information pieces $\hat{1}$ and $\hat{2}$ are recorded thereon.

As previously mentioned, when the optical disc 22 is placed in the apparatus and the drive of the optical disc 22 is started, a signal is reproduced from the lead-in area thereof. The information pieces $\hat{1}$–$\hat{6}$ are extracted from the reproduced signal. Immediately before the start of later recording, the temperature is measured via the temperature sensor 36. Calculation is made as to the difference between the present temperature and the temperature indicated by the information piece $\hat{3}$. Also, calculation is made as to the difference between the currently-set linear velocity and the linear velocity indicated by the information piece $\hat{3}$. The optimal waveform correction values (the optimal values of the waveform correction parameters) are revised on the basis of the calculated temperature difference and the calculated linear-velocity difference according to a calculation process or a table look-up process. The revision-resultant optimal waveform correction values are used in later recording.

Twenty-Sixth Embodiment

A twenty-sixth embodiment of this invention is a modification of the twenty-fifth embodiment thereof. In the twenty-sixth embodiment of this invention, the optical disc 22 has first and second recording layers. The first recording layer includes a specified area for storing the physical information, the information pieces $\hat{1}$–$\hat{6}$ related to the first recording layer, and the information pieces $\hat{1}$–$\hat{6}$ related to the second recording layer.

When the optical disc 22 is placed in the apparatus and the drive of the optical disc 22 is started, a signal is reproduced from the specified area of the first recording layer thereof. The information pieces $\hat{1}$–$\hat{6}$ related to the first recording layer, and the information pieces $\hat{1}$–$\hat{6}$ related to the second recording layer are extracted from the reproduced signal. During later recording on the first recording layer of the optical disc 22, the apparatus uses the optimal waveform correction values indicated by the information pieces $\hat{1}$ and $\hat{2}$ related to the first recording layer. During later recording on the second recording layer of the optical disc 22, the apparatus uses the optimal waveform correction values indicated by the information pieces $\hat{1}$ and $\hat{2}$ related to the second recording layer. On the other hand, in the absence of the two-layer-related information pieces $\hat{1}$ and $\hat{2}$ from the reproduced signal, the waveform correction optimizing process is executed on the first recording layer to determine the optimal waveform correction values (the optimal values of the waveform correction parameters) related to the first recording layer. Then, focus jump to the second recording layer is implemented, and the waveform correction optimizing process is executed on the second recording layer to determine the optimal waveform correction values related to the second recording layer. Signals of the optimal waveform correction values related to the first and second recording layers are encoded into the two-layer-related information pieces $\hat{1}$ and $\hat{2}$. Then, the two-layer-related information pieces $\hat{1}$ and $\hat{2}$ are recorded on the specified area of the first recording layer of the optical disc 22.

Twenty-Seventh Embodiment

A twenty-seventh embodiment of this invention is based on a combination of at least two of the first to twenty-sixth embodiments thereof. The twenty-seventh embodiment of this invention selectively uses at least one of the evaluation method "A", the evaluation method "B", and the evaluation method "C" as a part of the waveform correction optimizing process.

In the evaluation method "A", the test pattern signal having the alternation of the lowest-frequency signal "11 T" and the highest-frequency signal "3 T" is recorded on the optical disc 22, and the test pattern signal is reproduced therefrom. The asymmetries of respective time segments of the reproduced test pattern signal are measured.

In the evaluation method "B", the random signal is recorded on the optical disc 22 as the test pattern signal, and the random signal is reproduced therefrom. The jitters of the reproduced random signal are measured.

In the evaluation method "C", the feedback signal outputted from the monitor diode is measured while the power of the laser beam is changed among the reproducing level, the erasing level, and the recording level.

Figure 26:
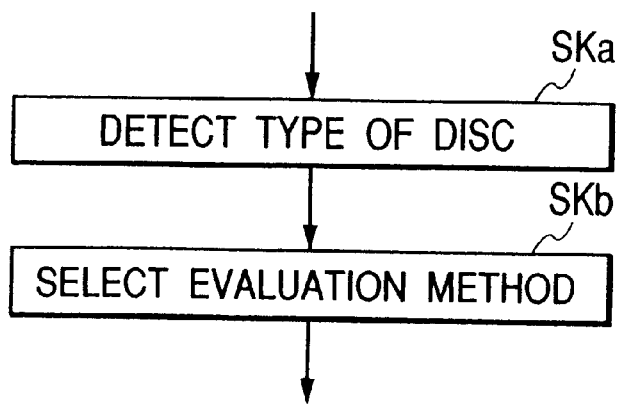
FIG. 26 is a flowchart of a program segment in a twenty-seventh embodiment of this invention.

FIG. 26 is a flowchart of a segment of a program for the system controller 12. The program segment in FIG. 26 is executed when the drive of the optical disc 22 is started. With reference to FIG. 26, a first step SKa of the program segment detects the type of the optical disc 22. For example, the step SKa measures the reflectivity of the optical disc 22, and decides the type of the optical disc 22 on the basis of the measured reflectivity.

A step SKb following the step SKa selects at least one from among the evaluation methods "A", "B", and "C". The step SKb executes the waveform correction optimizing process in accordance with the selected evaluation method (or the selected evaluation methods).

In the case where the type of the optical disc 22 is the DVD-RW type (the phase change rewritable type), the evaluation methods "B" and "C" are selected. In this case, only the evaluation method "B" may be selected. In the case where the type of the optical disc 22 is the DVD-R type (the organic-dye recordable type), the evaluation methods "A" and "C" are selected. In this case, only the evaluation method "A" may be selected.

Twenty-Eighth Embodiment

A twenty-eighth embodiment of this invention is a modification of the twenty-seventh embodiment thereof. In the twenty-eighth embodiment of this invention, when a disc position to be accessed at this time is separate from the disc position previously accessed for data recording by shorter than a predetermined distance, the evaluation method "C" is selected. When the lapse of time since the previous recording is shorter than a predetermined time interval, the evaluation method "C" is selected. When a disc position to be accessed at this time is separate from the disc position previously accessed for data recording by at least the predetermined distance, the evaluation method "A" or "B" is selected. When the lapse of time since the previous recording is equal to or longer than the predetermined time interval, the evaluation method "A" or "B" is selected.

Twenty-Ninth Embodiment

A twenty-ninth embodiment of this invention is a modification of the twenty-seventh embodiment thereof. In the twenty-ninth embodiment of this invention, the optical disc 22 has a specified area for storing disc intrinsic information (disc ID information). The disc intrinsic information represents the disc maker, the disc type, the disc article number, and the disc production lot number. The memory in the system controller 12 stores a table signal indicating the relation of the disc intrinsic information with the evaluation methods "A", "B", and "C".

Figure 27:
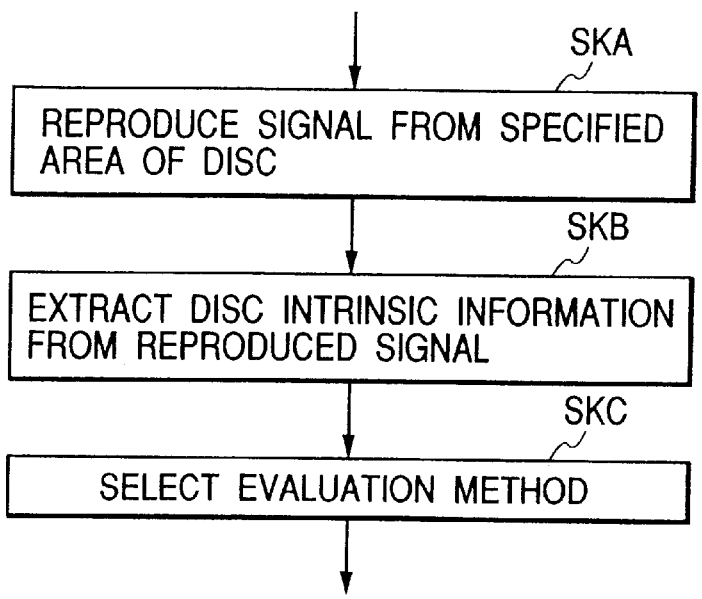
FIG. 27 is a flowchart of a program segment in a twenty-ninth embodiment of this invention.

FIG. 27 is a flowchart of a segment of a program for the system controller 12. The program segment in FIG. 27 is executed when the drive of the optical disc 22 is started. With reference to FIG. 27, a first step SKA of the program segment reproduces a signal from the specified area of the optical disc 22.

A step SKB following the step SKA extracts the disc intrinsic information from the reproduced signal.

A step SKC subsequent to the step SKB selects at least one from among the evaluation methods "A", "B", and "C" by referring to the table signal. The step SKC executes the waveform correction optimizing process in accordance with the selected evaluation method (or the selected evaluation methods).

Thirtieth Embodiment

A thirtieth embodiment of this invention is a modification of one of the first to twenty-ninth embodiments thereof. In the thirtieth embodiment of this invention, the test pattern generation circuit 64 is designed so that the test pattern signal can be shifted along a time base relative to the test ECC block by a variable quantity (a variable time interval). The shift quantity may be fixed to, for example, about 6 bytes measured in unit of the recording clock signal (the bit clock signal). The shift quantity may be variable in a range around 6 bytes measured in unit of the recording clock signal.

The shift quantity can be set by the system controller 12. In the case where the test pattern signal is recorded on an area of the optical disc 22 for the first time, the system controller 12 sets the shift quantity to "0". In the case where the test pattern signal is recorded again on an area of the optical disc 22 which was loaded with the test pattern signal, the system controller 12 generates a random signal. The system controller 12 sets the shift quantity to the random value represented by the random signal. The test pattern signal is shifted by the quantity set by the system controller 12. The test pattern signal is recorded. The test pattern signal is reproduced at timings shifted from the original timings by a quantity corresponding to the quantity set by the system controller 12. The asymmetries of respective time segments of the reproduced test pattern signal are measured.

Thirty-First Embodiment

A thirty-first embodiment of this invention is a modification of one of the first to thirtieth embodiments thereof. In the thirty-first embodiment of this invention, the test pattern generation circuit 64 is designed so that the lowest-frequency signal "11 T" and the highest-frequency signal "3 T" can be exchanged in time position in the test pattern signal.

In the case where the test pattern signal is recorded on an area of the optical disc 22 for the first time, the lowest-frequency signal "11 T" and the highest-frequency signal "3 T" are arranged in the test pattern signal in the order shown in FIG. 12. In the case where the test pattern signal is recorded again on an area of the optical disc 22 which was loaded with the test pattern signal, the lowest-frequency signal "11 T" and the highest-frequency signal "3 T" are arranged in the test pattern signal in the order opposite to that shown in FIG. 12. In this case, the highest-frequency signal "3 T" is recorded on the first sector, that is, the B0 sector in the ECC block. The lowest-frequency signal "11 T" is recorded on the second sector, that is, the B1 sector in the ECC block. Similarly, the signal arrangement is changed between the two different orders during later recording of the test pattern signal.

Thirty-Second Embodiment

A thirty-second embodiment of this invention is a modification of one of the twenty-seventh, twenty-eighth, and twenty-ninth embodiments thereof. In the thirty-second embodiment of this invention, during the first execution of the waveform correction optimizing process based on the evaluation method "C", the feedback signal outputted from the monitor diode is measured while the power (the intensity) of the laser beam is set to the erasing level and is then changed to the recording level. During the second execution of the waveform correction optimizing process based on the evaluation method "C", the feedback signal outputted from the monitor diode is measured while the power (the intensity) of the laser beam is set to the recording level and is then changed to the erasing level. Similarly, the arrangement of the power levels is changed between the two different orders during the later execution of the waveform correction optimizing process.

Thirty-Third Embodiment

A thirty-third embodiment of this invention is a modification of one of the first to thirty-second embodiments thereof In the thirty-third embodiment of this invention, the optical disc 22 has a predetermined area exclusively for storing the test pattern signal.

Thirty-Fourth Embodiment

A thirty-fourth embodiment of this invention is a modification of the thirty-third embodiment thereof. In the thirty-fourth embodiment of this invention, when the optical disc 22 is placed in the apparatus and the drive of the optical disc 22 is started, the test pattern signal is recorded on the exclusive area of the optical disc 22 and the waveform correction optimizing process is executed. During later recording, the waveform correction optimizing process is executed while the test pattern signal is recorded on an area of the optical disc which is assigned to contents data.

Thirty-Fifth Embodiment

A thirty-fifth embodiment of this invention is a modification of one of the twenty-seventh, twenty-eighth, twenty-ninth, and thirty-second embodiments thereof. The thirty-fifth embodiment of this invention executes the waveform correction optimizing process while combining at least two of the evaluation methods "A", "B", and "C" and implementing the combined evaluation methods.

What is claimed is:

1. A recordable optical disc ejectable from a recording apparatus, the recordable optical disc storing read only information and having a recordable area;
    wherein the read only information contains (1) information about a type of the disc which indicates whether the disc is a recordable disc or a rewritable disc, (2) information about a reflectivity of the disc, (3) information about a value of an optimal recording power for signal recording on the disc, (4) information about a time base of an optimal recording power waveform for signal recording on the disc, and (5) information about a manufacturer of the disc; and
    wherein the recordable area stores (1) information about a value of an optimal recording power for signal recording on the disc, (2) information about a time base of an optimal recording power waveform for signal recording on the disc, (3) information about a manufacturer of a recording apparatus for signal recording on the disc, and (4) information about an identification number of the recording apparatus.

2. A recordable optical disc ejectable from a recording apparatus, the recordable optical disc storing read only information and having a recordable area;
    wherein the read only information contains (1) information about a type of the disc which indicates whether the disc is a recordable disc or a rewritable disc, (2) information about a reflectivity of the disc, (3) information about a value of an optimal recording power for signal recording on the disc, (4) information about a time base of an optimal recording power waveform for signal recording on the disc, (5) information about a linear velocity of the disc, and (6) information about a manufacturer of the disc; and
    wherein the recordable area stores (1) information about a value of an optimal recording power for signal recording on the disc, (2) information about a time base of an optimal recording power waveform for signal recording on the disc, (3) information about a linear velocity of the disc, (4) information about a manufacturer of a recording apparatus for signal recording on the disc, and (5) information about an identification number of the recording apparatus.

3. A recordable optical disc ejectable from a recording apparatus and comprising a plurality of layers on and from which information can be recorded and reproduced, wherein at least one of (1) information about a type of the disc, (2) information about a reflectivity of the disc, (3) information about a value of an optimal recording power for signal recording on the disc, (4) information about a time base of an optimal recording power waveform for signal recording on the disc, (5) information about a linear velocity of the disc, and (6) information about a manufacturer of the disc is stored in at least one of the layers.

4. A recordable optical disc ejectable from a recording apparatus and comprising a plurality of layers on and from which information can be recorded and reproduced, wherein at least one of (1) information about a value of an optimal recording power for signal recording on the disc, (2) information about a time base of an optimal recording power waveform for signal recording on the disc, (3) information about a linear velocity of the disc, (4) information about a manufacturer of the disc, and (5) information about a manufacturer of a recording apparatus for signal recording on the disc is stored in at least one of the layers.

5. An apparatus for recording and reproducing an information signal on and from a recordable optical disc storing read only information and having a recordable area, the apparatus comprising:
    first means for detecting whether or not information about a recording power for signal recording on the disc is stored in the recordable area of the disc;
    second means for, when the first means detects that the information about the recording power for signal recording on the disc is stored in the recordable area of the disc, recording a usual information signal on the disc in response to the information about the recording power;
    third means for, when the first means detects that the information about the recording power for signal recording on the disc is not stored in the recordable area of the disc, implementing test recording on the disc to generate information about a recording power for signal recording on the disc; and
    fourth means for writing the recording-power information generated by the third means into the recordable area of the disc.

6. A method of recording and reproducing an information signal on and from a recordable optical disc storing read only information and having a recordable area, the method comprising the steps of:
    a) detecting whether or not information about a recording power for signal recording on the disc is stored in the recordable area of the disc;
    b) when the step a) detects that the information about the recording power for signal recording on the disc is stored in the recordable area of the disc, recording a usual information signal on the disc in response to the information about the recording power;
    c) when the step a) detects that the information about the recording power for signal recording on the disc is not stored in the recordable area of the disc, implementing test recording on the disc to generate information about a recording power for signal recording on the disc; and d) writing the recording-power information generated by the step c) into the recordable area of the disc.

7. An apparatus for recording and reproducing an information signal on and from a recordable optical disc storing read only information and having a recordable area, the apparatus comprising:

first means for detecting whether or not information about a recording power for signal recording on the disc and information about a time base of a recording power waveform for signal recording on the disc are stored in the recordable area of the disc;

second means for, when the first means detects that the information about the recording power for signal recording on the disc and the information about the time base of the recording power waveform for signal recording on the disc are stored in the recordable area of the disc, recording a usual information signal on the disc in response to the information about the recording power and the information about the time base;

third means for, when the first means detects that the information about the recording power for signal recording on the disc and the information about the time base of the recording power waveform for signal recording on the disc are not stored in the recordable area of the disc, implementing test recording on the disc to generate information about a recording power for signal recording on the disc and information about a time base of a recording power waveform for signal recording on the disc; and fourth means for writing the recording-power information and the time-base information generated by the third means into the recordable area of the disc.

8. A method of recording and reproducing an information signal on and from a recordable optical disc storing read only information and having a recordable area, the method comprising the steps of:

a) detecting whether or not information about a recording power for signal recording on the disc and information about a time base of a recording power waveform for signal recording on the disc are stored in the recordable area of the disc;

b) when the step a) detects that the information about the recording power for signal recording on the disc and the information about the time base of the recording power waveform for signal recording on the disc are stored in the recordable area of the disc, recording a usual information signal on the disc in response to the information about the recording power and the information about the time base;

c) when the step a) detects that the information about the recording power for signal recording on the disc and the information about the time base of the recording power waveform for signal recording on the disc are not stored in the recordable area of the disc, implementing test recording on the disc to generate information about a recording power for signal recording on the disc and information about a time base of a recording power waveform for signal recording on the disc; and d) writing the recording-power information and the time-base information generated by the step c) into the recordable area of the disc.

* * * * *